United States Patent
Iwasaki

[11] Patent Number: 6,154,612
[45] Date of Patent: Nov. 28, 2000

[54] ELECTRONIC FLASH CONTROL DEVICE

[75] Inventor: Hiroyuki Iwasaki, Yokohawa, Japan

[73] Assignee: Nikon Corporation, Tokyo, Japan

[21] Appl. No.: 09/218,538

[22] Filed: Dec. 22, 1998

[30] Foreign Application Priority Data

Dec. 22, 1997 [JP] Japan ................... 9-353291

[51] Int. Cl.[7] .............................. G03B 7/16; G03B 15/05
[52] U.S. Cl. ............................ 396/61; 396/67; 396/157; 396/161; 396/170
[58] Field of Search ........................ 396/157, 61, 65–69, 396/159, 161, 163, 160, 162, 166–170, 172

[56] References Cited

U.S. PATENT DOCUMENTS

| Re. 35,877 | 8/1998 | Takagi | 396/157 |
|---|---|---|---|
| 5,172,157 | 12/1992 | Takagi | 396/157 |
| 5,400,112 | 3/1995 | Takagi | 396/157 |
| 5,504,553 | 4/1996 | Takagi | 396/157 |
| 5,576,798 | 11/1996 | Takagi | 396/157 X |
| 6,029,011 | 2/2000 | Sato | 396/157 |

Primary Examiner—W. B. Perkey
Attorney, Agent, or Firm—Erik B. Cherdak & Associates, LLC

[57] ABSTRACT

A flash control device for a camera includes a light emission unit which emits light to illuminate a subject to be imaged by the camera, a preliminary light emission control unit which causes the light emission unit to emit light during a preliminary light emission operation prior to a main exposure operation to be performed by the camera and until a predetermined amount of light is received by the camera during the preliminary light emission operation, a range computing unit which computes a distance from the camera to the subject, an exposure calculation unit which computes an aperture value for the camera during the preliminary light emission operation, a main light emission calculation unit which calculates a length of time that the light emission unit is to emit light during a main light emission operation based on the preliminary light emission operation, the computed distance to the subject, and the aperture value, and a main light emission control unit which controls the emission of light by the light emission unit during a main exposure operation within the camera based on an output of the main light emission calculation unit. A corresponding method for controlling an electronic flash unit adapted for use with a camera or other imaging device also is provided.

31 Claims, 20 Drawing Sheets

36 MONITOR ELEMENT

ELECTRONIC FLASH CONTROL DEVICE

BACKGROUND OF THE INVENTION

1. Field of the Invention

The present invention relates to electronic flash control units used with cameras and imaging devices and, more particularly, to flash control devices which utilize TTL type light adjustment components and methods.

2. Description of the Related Art

Automatic light adjustment devices found in flash illumination units (also referred to as "SB" type flash adjustment and control devices) have been designed, for the most part, to be used with single lens reflex (SLR) cameras. Such adjustment devices utilize control methods in which an emitted light beam reflected by a subject passes through a photographic or taking lens (i.e., an objective lens) so that photometry is performed in real time based on the light reflected for photographic operations. As such, when an optimum amount of light has been emitted, reflected, and detected, flash light emission is stopped. And, because photometry is performed based on a light beam which passes through a photographic lens, there is no displacement or parallax between a subject region which is to be photographed and a subject region for which photometry is performed. As a result, a photographer can take advantage of automatically set aperture values, etc., without slowing or impeding photographic operations.

Despite the effectiveness of light emission control systems commonly used with single lens reflex cameras, in cameras and imaging devices that utilize TTL light adjustment components and methods, the diffusion characteristics of a photographic surface (e.g., a silver salt based film or a solid state imaging element, etc.) are based on an assumption that such a photographic surface is capable of complete light diffusion. And, in the case that the diffusion characteristics markedly differ from a completely diffusing surface light emission control properties, among others, are poor to the point that poor photographic results may be obtained.

For example, with solid state imaging elements used as photographic imaging surfaces of electronic cameras, the diffusing characteristics of the imaging elements themselves are poor and, due to the effects of cover glass and the like disposed in its foreground, the diffusion characteristics depart markedly from those of a completely diffusing surface. As such, in electronic and digital type cameras that utilize TTL light adjustment structures and methods, suitable exposures were not obtained.

In order to solve such problems and to further realize the benefits of TTL type light adjustment systems and methods, especially in non-SLR type cameras, various solutions have been proposed. One such exemplary system is shown and described in Japanese Laid-Open Patent Publication JP-A-9-90461. Such a system seeks to control camera exposures at the time of SB use.

A system like that shown in the aforementioned Japanese patent publication is shown in a drawing figure identified as FIG. 20 which is attached to this patent document. In particular, a first operation 51 (for example, a camera operation commencing upon half-depression of a shutter button, etc.) includes photometry determination via photometric means 52 and range finding and aperture control via means 53.

During a second operation 54 (for example, a camera operation commencing upon full-depression of a shutter button, etc.), preliminary light emission by an SB light emission unit 57 occurs. Simultaneously, a preliminary exposure 55, based on the result of the preliminary exposure 55, sets the SB light emission amount of the light emission unit 57 for the time of a main exposure 56.

Unfortunately, in devices like those mentioned above, significant time was spent gathering preliminary illumination data and generating corresponding outputs. Such time was necessary as reliable calculation of a main illumination period for flash based imaging operations required successive preliminary flashes to reach a qualified result. Due to the number of signals involved and the computations necessary to reliably compute a main illumination period, imaging device (camera, etc.) operations were slowed. Such problems were compounded by the fact that imaging devices commonly utilized a single flash source for both preliminary and main illumination.

Thus, there exists a need to provide new and improved flash device control devices and methods that reliably reduce the amount of time taken to compute a main illumination period without unduly reducing image quality and the like. To be viable, such flash control devices and methods must be suited to be implemented in self-contained camera assemblies and in separately attachable flash units.

SUMMARY OF THE INVENTION

The present invention has as its object to provide a flash control device which utilizes the known advantages of TTL type light adjustment and, ultimately, which makes it possible for a photographer to freely set camera aperture value and the like and which shortens data processing time during preliminary lighting operations. Additionally, the present invention allows TTL light adjustment operations at a time of a main camera exposure operation regardless of the presence and diffusing characteristics of a particular imaging surface. Also, the present invention now allows TTL type light adjustment operations to be performed without problems associated with parallax between an imaging region and a photometric region often realized by prior systems and methods.

In summary the present provides an electronic flash device and corresponding control apparatus which sets a period of time for main illumination operations based on a preliminary illumination operation that last only as long as necessary to achieve desired imaging results. More particularly, the present invention performs preliminary light emission to control main illumination operations by performing the former until a predetermined quantity of reflected light is realized. Accordingly, the present invention now allows flash based camera operations to occur without unduly waiting for unnecessary computations to be performed.

The present invention achieves the above-stated object and delivers the aforementioned benefits by providing a flash control device for a camera includes a light emission unit which emits light to illuminate a subject to be imaged by the camera, a preliminary light emission control unit which causes the light emission unit to emit light during a preliminary light emission operation prior to a main exposure operation to be performed within the camera and until a predetermined amount of light is received by the camera during the preliminary light emission operation, a range computing unit which computes a distance from the camera to the subject, an exposure calculation unit which computes an aperture value for the camera during the preliminary light emission operation, a main light emission calculation unit which calculates the length of time that the light emission unit is to emit light during a main light emission operation based on the preliminary light emission operation, the computed range and aperture values, and a main light emission control unit which controls the emission of light by the light emission unit during a main exposure operation within the camera based on an output of the main light emission calculation unit. Also provided in a corresponding method for controlling an electronic flash unit.

BRIEF DESCRIPTION OF THE DRAWING FIGURES

The present invention is described below with reference to the following drawing figures, of which:

DETAILED DESCRIPTION OF THE PREFERRED EMBODIMENTS

Figure 1:
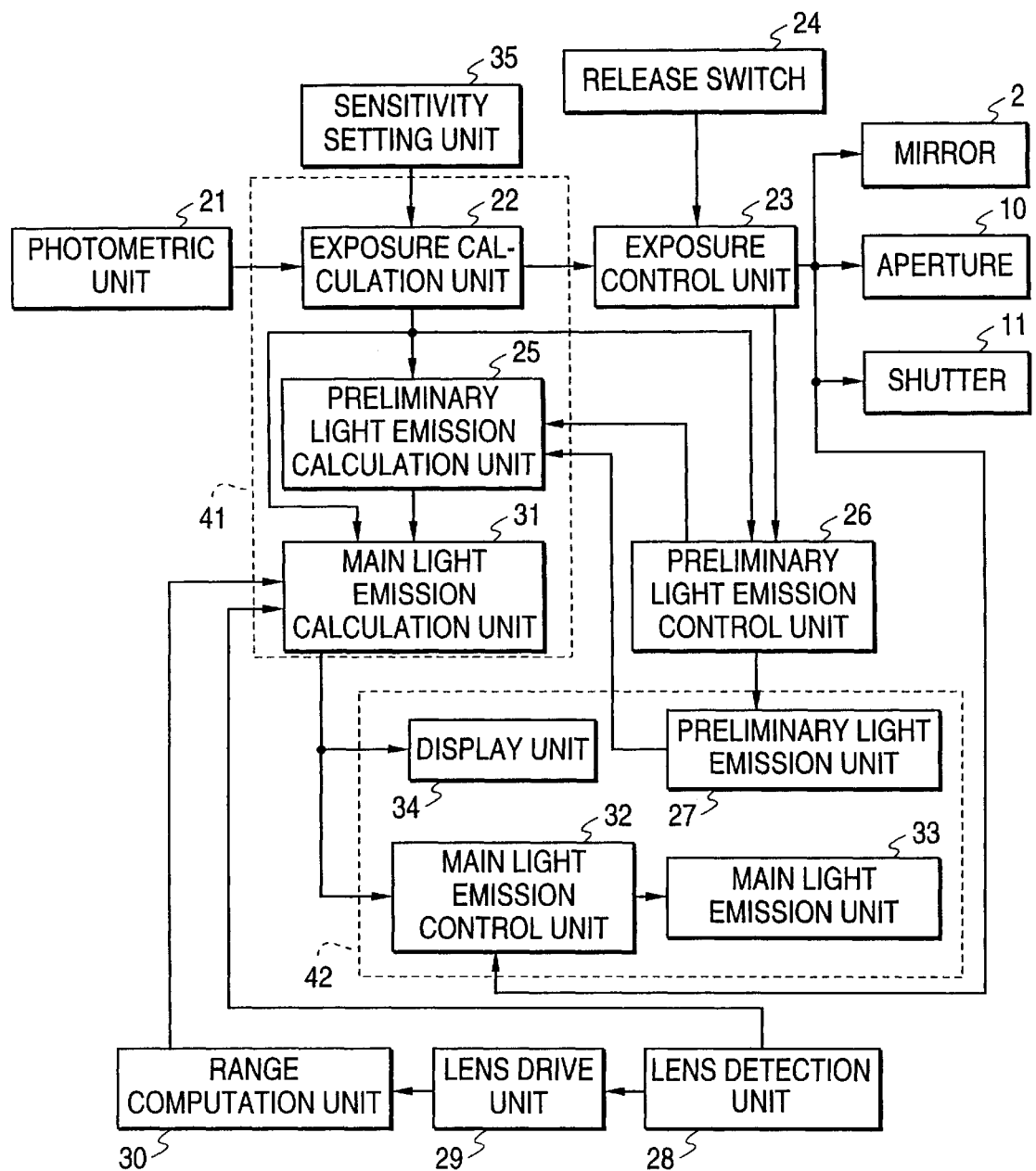
FIG. 1 is a block diagram of a flash control device according to a preferred embodiment of the present invention.

The present invention is now discussed with reference to the drawing figures that were briefly described above. A discussion of each preferred embodiment of the present invention is followed by a corresponding discussion of its operation. Unless otherwise specified, like parts and processes are referred to with like reference numerals.

Figure 3:
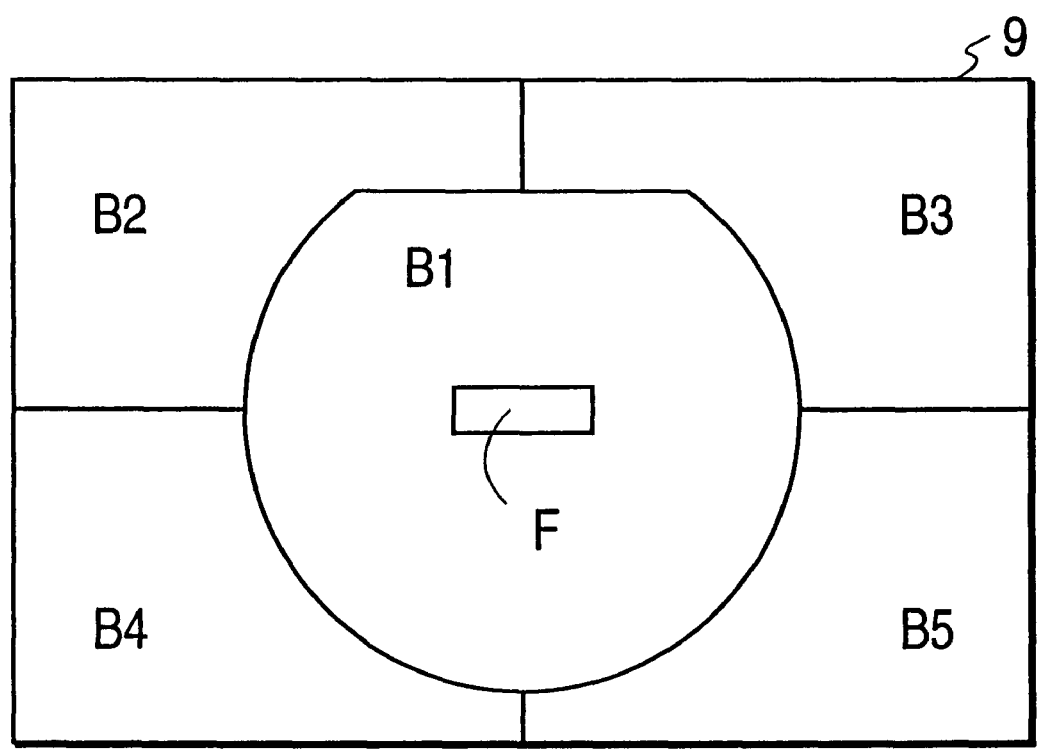
FIG. 3 is a diagram of a partitioned/divided photometry system of a flash control device according to a preferred embodiment of the present invention.

Referring now to FIG. 1, depicted therein is a block diagram of a preferred embodiment of the present invention. In particular, FIG. 1 is a block diagram of a flash control device for use with a camera (e.g., a film camera, a digital camera, etc.). Accordingly, a photometric unit 21 embodies a circuit which measures light reflected from a subject field and a subject using, for example, SPD (silicon photodiodes) and the like. Photometric outputs are output to an exposure calculation unit 22 for appropriate processing. Photometric unit 21, as shown in FIG. 3, measures light by dividing the subject field into five regions B1–B5, respectively, to output a correspond number of luminosity values.

Based on the outputs from the photometric unit 21 and certain film sensitivity information from the sensitivity setting unit 35, exposure calculation unit 22 computes appropriate exposure values which relate to steady light exposure, etc. Such appropriate exposure values also are used to generate aperture values and shutter values. The output from exposure calculation unit 22 is input to an exposure control unit 23. Moreover, aperture values are output to a preliminary light emission control unit 26, a preliminary light emission calculating unit 25, and a main light emission calculating unit 31.

Figure 2:
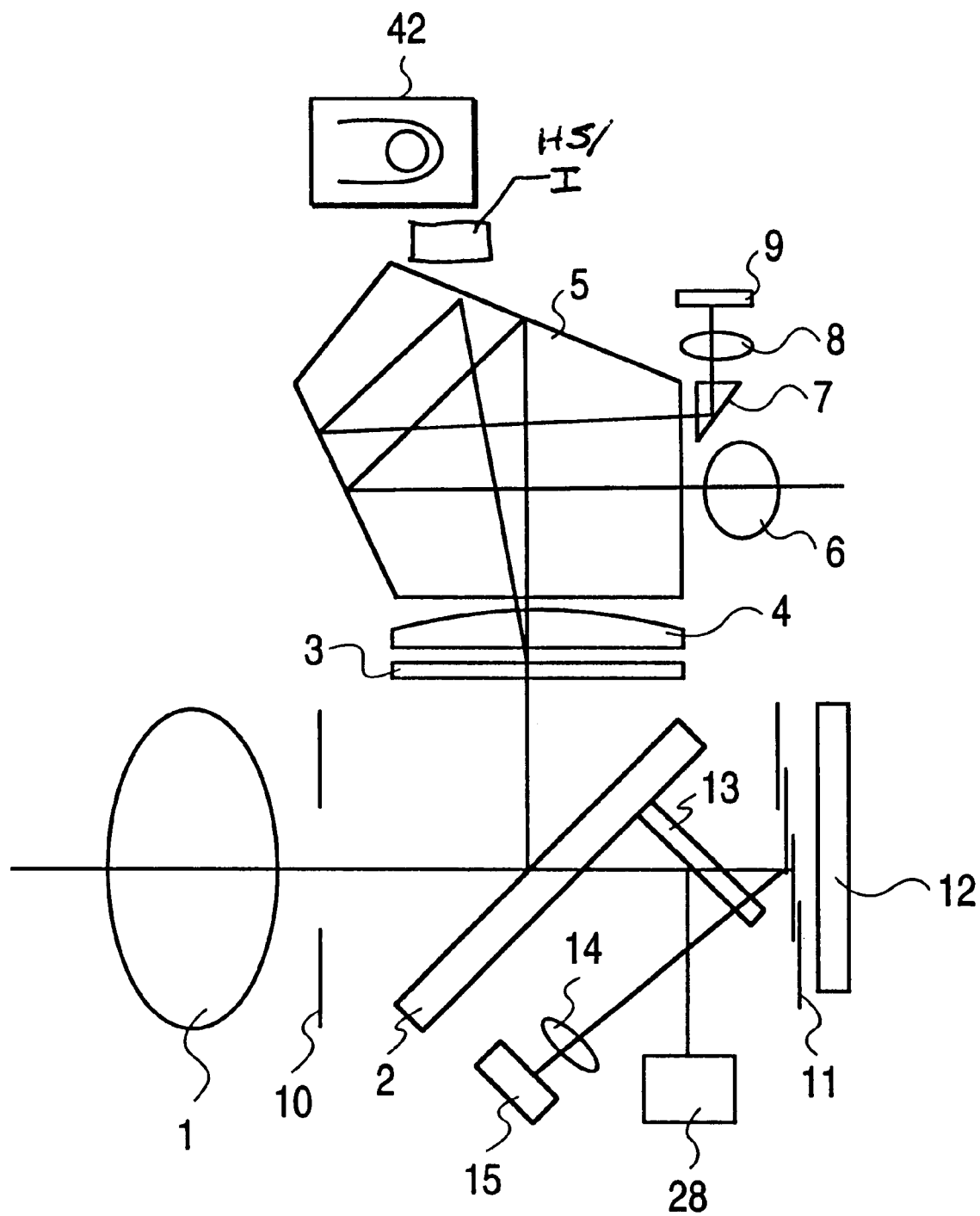
FIG. 2 is a block diagram of an imaging device (e.g., a camera, etc.) that incorporates a flash control device provided in accordance with the present invention.

Exposure control unit 23 controls exposure settings within a camera based on the appropriate exposure value generated by the exposure calculation unit 22. Such control is achieved by a mirror 2, an aperture 10, and a shutter 11 when exposure control unit 23 receives a release signal from a release button/switch 24. Such exposure operations are achieved when a quick return mirror as shown in FIG. 2 is raised after aperture 10 is stopped from moving downward at predetermined value/position. Thereafter, exposure calculation unit 23 outputs a preliminary light emission commencement signal to preliminary light emission control unit 26.

In the structure shown in FIG. 1, the outputs from preliminary light emission control unit 26 are used to cause preliminary light emission unit 27 to emit light (such as in pulses). Preliminary light emission control unit 26, in accordance with the present invention, is used to control preliminary light emission by permitting preliminary light to be emitted by emission unit 27 until a predetermined amount of reflected light is received by structures (e.g., photometric structures) within preliminary light emission control unit 26). Accordingly, when preliminary light emission control unit 26 inputs a preliminary light emission commencement signal from exposure control unit 23 (e.g., after half-depression of a shutter release button, etc.), preliminary light emission control unit 26 sets the gain of an integrating amplifier (not shown) according to the value of a set shutter value input from exposure calculation unit 22. And, in accordance with a predetermined guide number (e.g., a value corresponding to an ISO film sensitivity such as ISO 100), preliminary light emission control unit 26 causes repeated or continued light emission(s) by preliminary light emission unit 27 in flash light emission unit 42 (FIG. 2) until the integration output of the aforementioned integrating amplifier reaches a predetermined value. Upon realization of such a predetermined value, preliminary light emission control unit 26 outputs a corresponding STOP signal.

Figure 4:
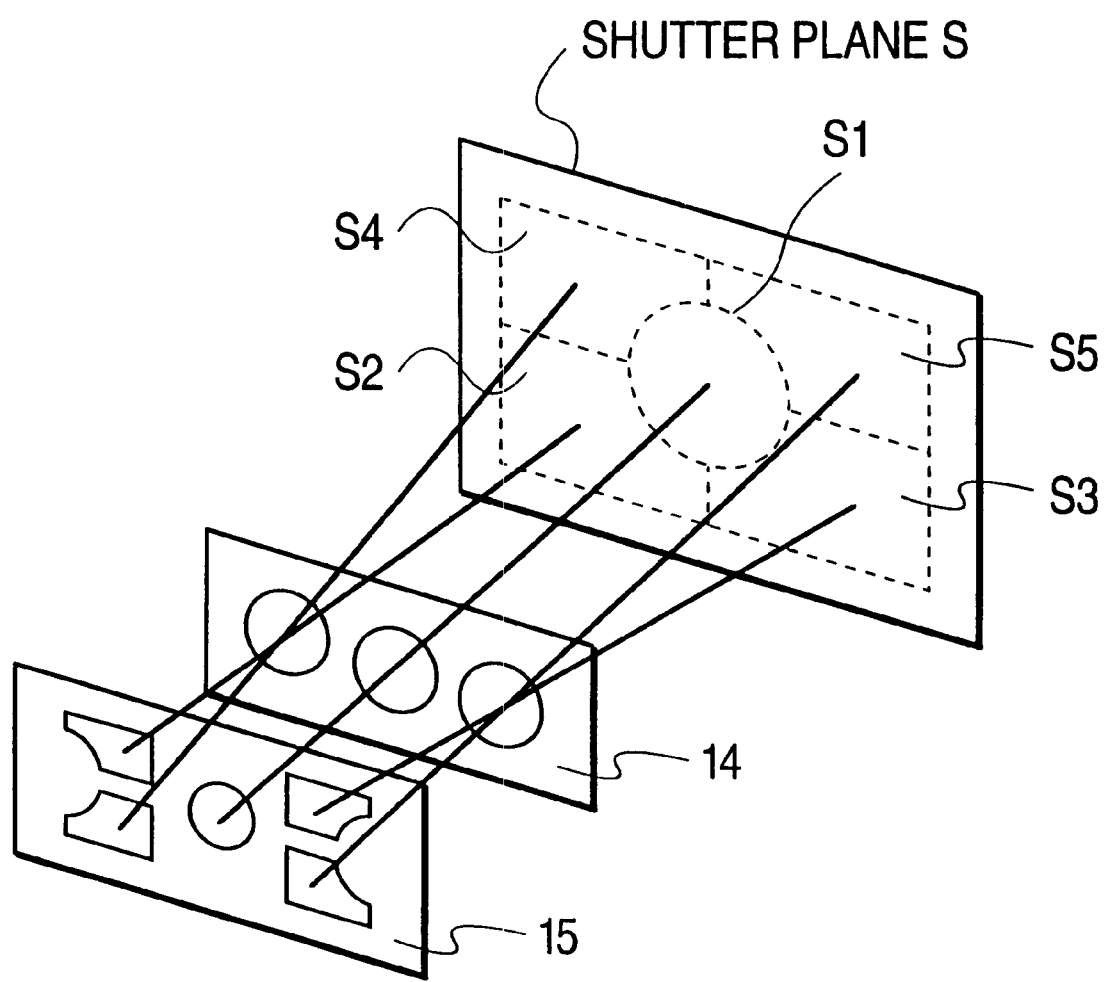
FIG. 4 is a diagram of a portion of an optical system of preliminary light emission control unit of a flash control device according to a preferred embodiment of the present invention.

As shown in FIG. 4, a subject imaged on shutter surface S is re-imaged on a light adjustment element 15 via light adjustment lens 14. The re-imaged subject is divided into five regions S1–S5 to respectively generate a corresponding number of photometric signals. Such photometric signals are accumulated into an accumulated electric charge. When the accumulated electric charge among regions S1–S5 reaches a predetermined value, a STOP signal is output by preliminary light emission control unit 26 as discussed above with regard to FIG. 1. The output of such a STOP signal in accordance with the present invention allows speedy termination of a preliminary light emission operation.

When preliminary light emission calculating unit 25 inputs a STOP signal generated by preliminary light emission control unit 26, preliminary light emission calculating unit 25 inputs signals IG(1)–IG(5) corresponding to the five (5) regions S1–S5 as discussed above with regard to FIG. 4. Based on the aperture value output from the exposure calculation unit 22 and a preliminary light emission guide number identified as GNp1 for one preliminary light emission from the preliminary light emission 27 (e.g., flash tube lighting source, etc.), preliminary light emission calculating unit 25 computes preliminary light emission guide numbers GNrtn(1)–GNrtn(5) corresponding to regions S1–S5, and outputs the same to main light emission calculating unit 31. The aforementioned computation methods for generating such guide numbers GNrtn(1)–GNrtn(5) are described in detail below with regard to FIGS. 9–19.

A focus detection unit 28 is used to detect the focus state for the center of the subject field as illustrated at region F in FIG. 3, for example. Such focus state information is output to a lens drive unit 29. Lens drive unit 29 drives a photographic lens 1 (e.g., a taking lens), until the amount of focus displacement is 0. A range computing unit 30 computes a focus position at a time when focus displacement is 0 based on an encoder output according to the position of a range ring of photographic lens 1, (not shown) and outputs such focus position value as a value D of the photographic range to the subject from the camera body (not shown) to main light emission calculating unit 31.

Main light emission calculating unit 31 computes a main light emission guide number based on the preliminary light emission guide numbers GNrtn(1)–GNrtn(5) generated by preliminary light emission calculating unit 25 during a preliminary illumination operation, the photographic range value D generated by range computing unit 30, and the aperture value F (found from AV value) from exposure calculation unit 22. The resultant guide number is output to a main light emission control unit 32 and to a display unit 34 (for review by a photographer, etc.). The method of computing the main light emission guide number is described in detail below with regard to FIGS. 9–19.

Exposure control unit 23 controls shutter 11 based on the shutter value found by exposure calculation unit 22. At the point in time when shutter 11 becomes fully opened, exposure control unit 23 outputs a main light emission commencement signal to a main light emission control unit 32.

When main light emission control unit 32 inputs a main light emission commencement signal from exposure control unit 23, it causes the main light emission unit 33 to emit for a period of time equal to the calculated exposure time based on the guide number input from the main light emission calculating unit 31. Additionally, display unit 34 performs a display of the main light emission guide number from main light emission calculating unit 31.

Exposure calculation unit 22, preliminary light emission calculating unit 25, and main light emission calculating unit 31 may be embodied within a single chip microprocessor such as one indicated by the dashed line identifying microprocessor/data processing element 41 (discussed below). Moreover, preliminary light emission unit 27 and main light emission unit 33 may be implemented as successive light emissions from a single light emission structure such as a single flash tube. Main light emission control unit 32 and display unit 34 may be housed in a flash device 42 case to be removably detachable from a camera body and the like. Alternatively, main light emission control unit 32 and display unit 34 may be housed within a unified camera body. The present invention contemplates no required physical arrangement of the component parts described herein and, instead, envisions any arrangement that suits particular design requirements.

As shown in FIG. 1, a dashed line forms a box around exposure calculation unit 22, preliminary light emission calculation unit 25, and main light emission calculation unit 31. Such a dashed line/box is intended to indicate a logical structural relationship which may be implemented, as noted above, with a single chip microprocessor or other data processing/computing element identified as structure 41. Accordingly, in the event that a single data processor is used, the same may be programmed with computer software (as in the case of the present preferred embodiment as discussed below with regard to FIGS. 9–19) to achieve the functionality described herein. The programming of such a data processing system to achieve the functionality discussed herein will be immediately understood by those skilled in the art after reviewing the entirety of this detailed description of the preferred embodiments of the present invention.

Additionally, as shown in FIG. 1, a dashed line/box is shown around display unit 34, main light emission control unit 32, preliminary light emission unit 27, and main light emission unit 33. Accordingly, the dashed line/box is intended to identify a logical structural relationship which may be implemented in flash unit 42. Such a flash unit 42 may be implemented as a separately attachable and detachable flash unit which may be mounted on or to a camera body via a hot shoe structure which will be immediately understood by those skilled in the art. It should be understood that although separate preliminary light emission and main light emission units 27 and 33, respectively, have been shown and described, the present invention is not so limited. To the contrary, a single flash tube structure may be used to provide the functionality of both preliminary light emission unit 27 and main light emission unit 33. Alternatively, multiple, separate lighting sources may be used.

Referring again to FIG. 2, depicted therein is a diagram of an optical system of an SLR camera according to a preferred embodiment of the present invention. In particular, a light beam passing through photographic/taking lens 1 reaches a photo-grapher's eye via quick return mirror 2, diffusing screen 3, condenser lens 4, pentaprism 5, and eyepiece lens 6. A portion of the light beam diffused by the diffusing screen 3 reaches the photometric element 9 via the condenser lens 4, pentaprism 5, prism 7 for photometric use, and lens 8 for photometric use.

A portion of quick return mirror 2 is half-silvered in order to cause transmission of a portion of the light beam. The transmitted light beam is deflected downward by a submirror 13 and is incident on focus detection unit 28.

At the time of flash light emission, aperture 10 opens to a predetermined value and the quick return mirror 2 and the sub-mirror 13 are raised. Preliminary light emission is performed by means of the flash light emission unit 42. Light reflected by the subject, after passing through photographic lens 1 and aperture 10, is imaged on shutter 11. Such reflected light is reflected by shutter 11 and re-imaged onto a light adjustment element 15 (e.g., a photometric element of preliminary light emission control unit 26) by means of a lens 14 for light adjustment use.

At the time of exposure, shutter 11 opens, and the light beam passes to imaging element 12. Imaging element 12 may be implemented using a CCD or the like solid state imaging element, for example.

Accordingly, the present invention does not require reflected light from an imaging surface (such as one having poor diffusion characteristics) to be used to effect light adjustment operations. Instead, the present invention utilizes shutter 11 to reflect incident light. Even when a solid state imaging element is used, a shutter may be deployed in front of such an element to act both as a shutter and as a reflective light guide that guides incident light to preliminary illumination control unit 26 and, in particular, to light adjustment element 15 thereof.

In FIG. 2, the box identified as HS/I is intended to indicate a Hot Shoe or other Interface unit that may be used to couple flash unit 42 to a camera in the case of separate structures provided in accordance with the present invention.

Referring now to FIG. 3, depicted therein is a diagram that illustrates a subject field which has been divided by photometric element 9 within a flash control device according to a preferred embodiment of the present invention. Photometric element 9 performs photometry by dividing the subject field into five (5) segments, and can output the respective photometric values B1–B5 as described above. Moreover, the center region F is a region in which the focus detection unit 28 (within the camera) may perform focus detection and the like.

Referring now to FIG. 4, depicted therein is diagram of the optical system embodied within a camera which is used by preliminary light emission control unit 26 within a flash control device according to a preferred embodiment of the present invention. In preliminary light emission control unit 26, as discussed above, a subject image was imaged on shutter surface S and was re-imaged by means of a series of three light adjustment lenses 14 onto light adjustment element 15. In particular, the subject image was divided into five (5) regions S1–S5 so as to accumulate respective photo-electrically converted electric charges. Here, the regions numbered S1–S5 correspond to the respective regions numbered B1–B5 in FIG. 3.

Figure 5:
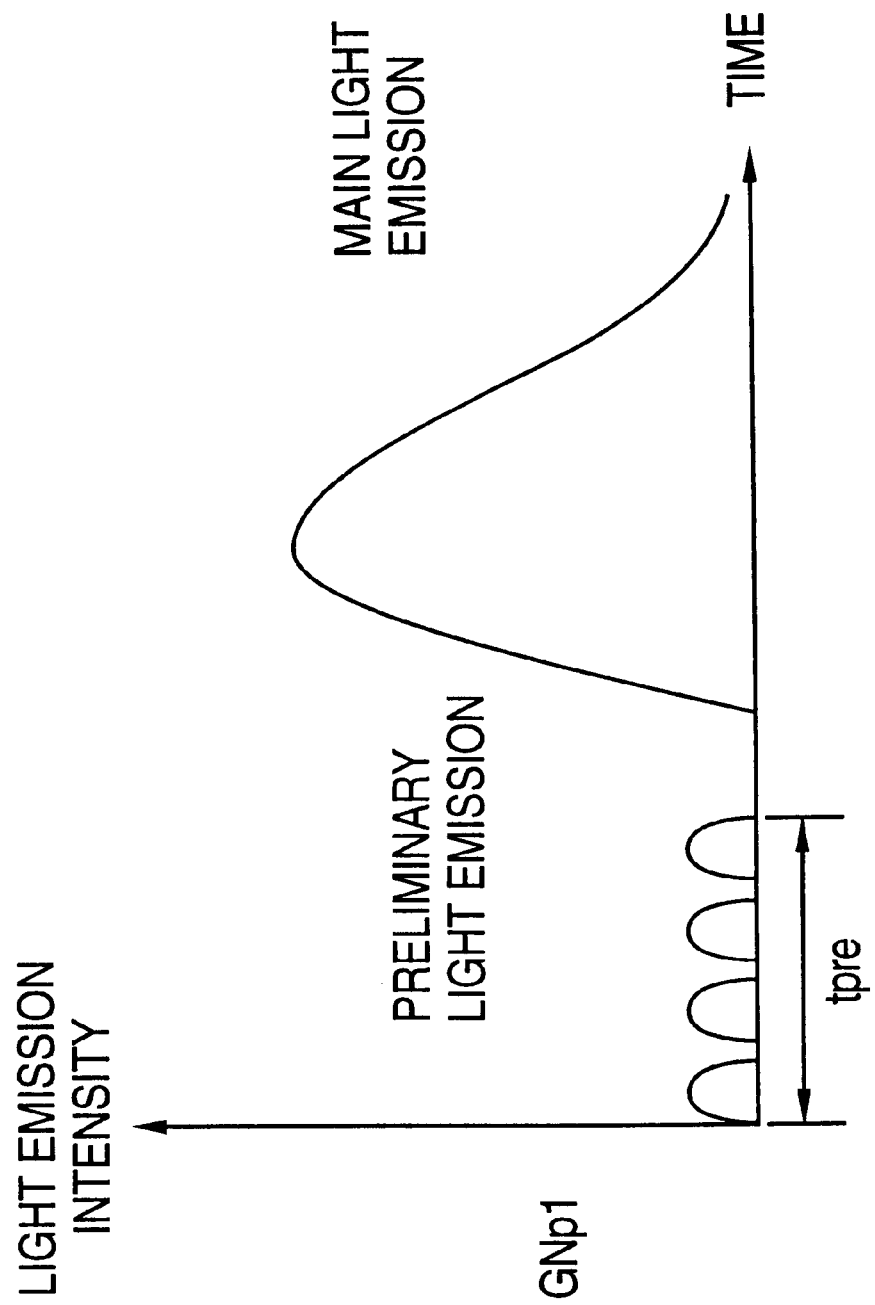
FIG. 5 is a graph that illustrates preliminary light emission within a flash control device according to a preferred embodiment of the present invention.

Referring now to FIG. 5, depicted therein is a graph that illustrates the operation of a flash control device according to a preferred embodiment of the present invention. Preliminary light emission according to a predetermined guide number GNp1 continues until either a STOP signal is generated or preliminary light emission is performed a predetermined number of times (e.g., 16 times, etc.). The guide number GNp1 is communicated between the flash unit and the camera such as via a hot shoe connection. As shown in FIG. 5, upon preliminary light emission commencement, the camera performs timing of the preliminary light emission time t pre.

Figure 6:
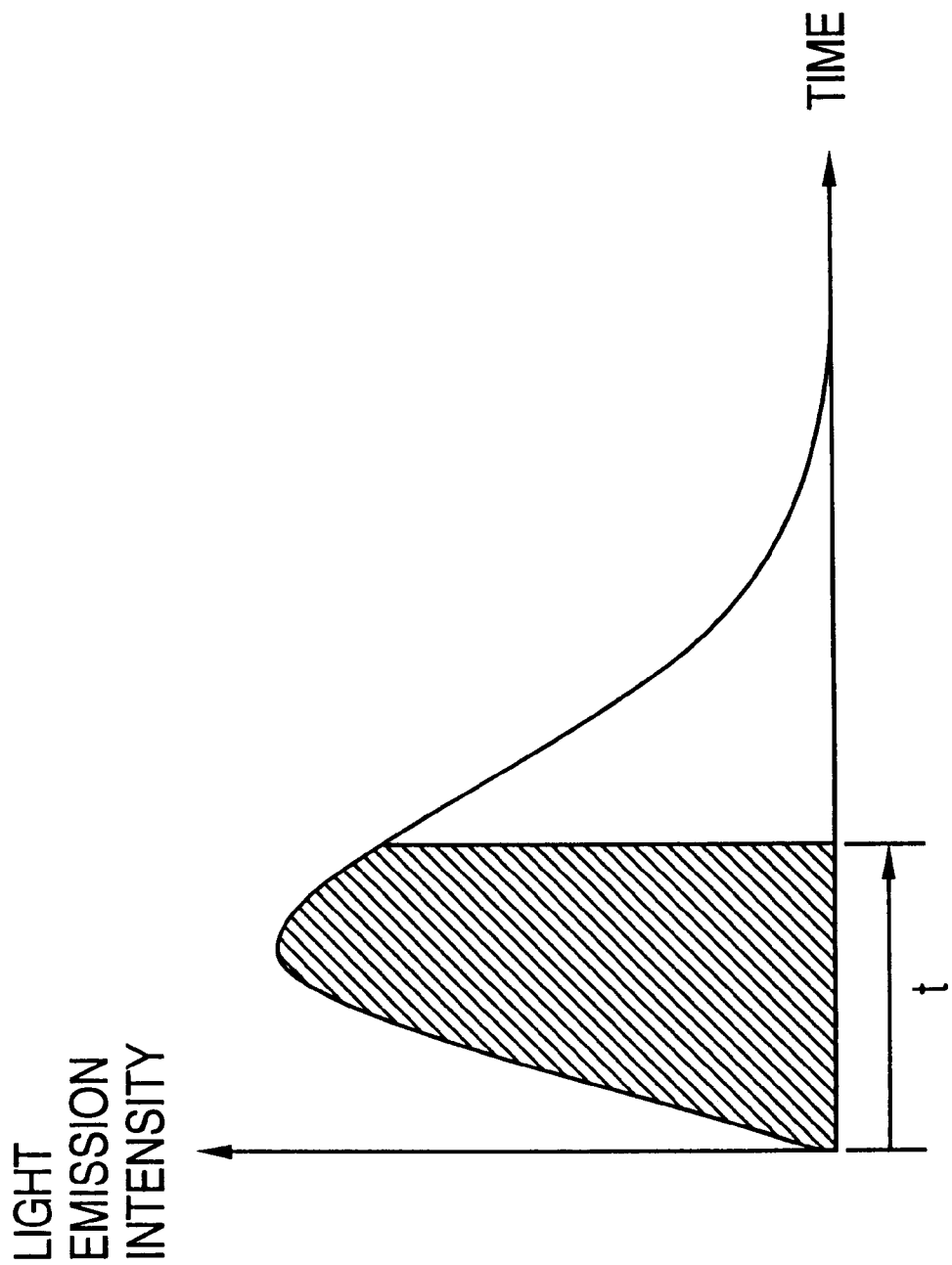
FIG. 6 is a graph showing the situation (relationship of SB light emission intensity and time) of main light emission of a flash control device according to a preferred embodiment of the present invention.

Referring now to FIG. 6, depicted therein is a graph of the that illustrates the relationship of the light emission intensity of a flash unit provided by the present invention to time. Light emission intensity integrated over time is shown by the area under the curve. Accordingly, the guide number generated to control flash unit 42 can be controlled by means of managing the flash emission time.

Figure 7:
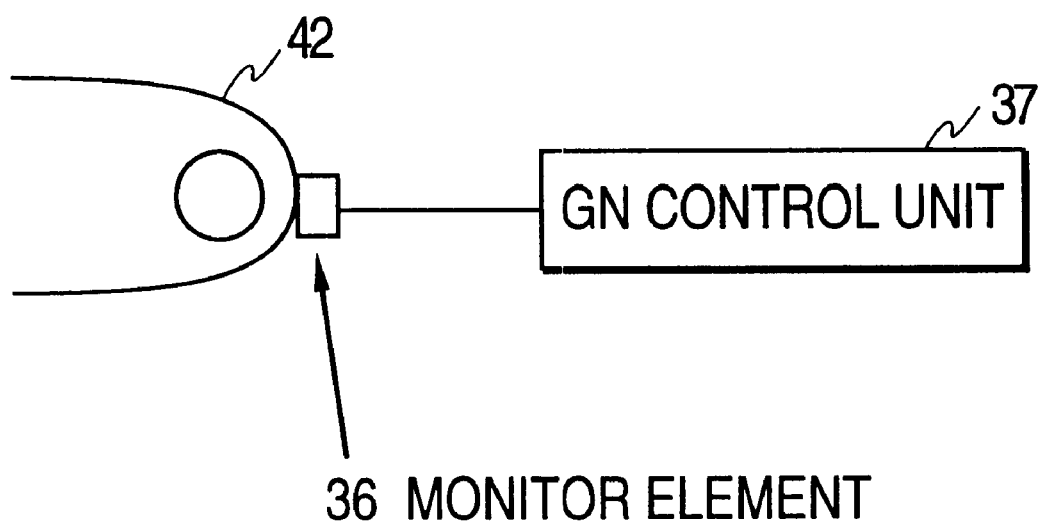
FIG. 7 is a diagram which illustrates a main light amount control method of a flash control device according to a preferred embodiment of the present invention.

FIG. 7 is a diagram that illustrates the main light emission control in a flash control device provided according to the present invention. Because the intensity of the emitted light is dependent on the charging voltage of a flash unit, if the charging voltage is changed, even if the light emission time is the same, its guide number changes. For example, by changing the amount of time during which to perform preliminary light emission, the charging voltage corresponding to the main light emission time differs, and the case arises of imaging when the charging voltage is not sufficient, and the like. In such a case, with the charging voltage and the number of times of preliminary light emission as the parameters, the relationship of the light emission time t to the guide number can be calculated. Accordingly, in this mode of embodiment, as shown in FIG. 7, a monitor element 36 is disposed within the flash unit to directly monitor the amount of light emission from the flash unit after calculation of a desired guide number. As such, monitor element 36 in conjunction with a GN control unit 37 can be used to STOP illumination.

Figure 8:
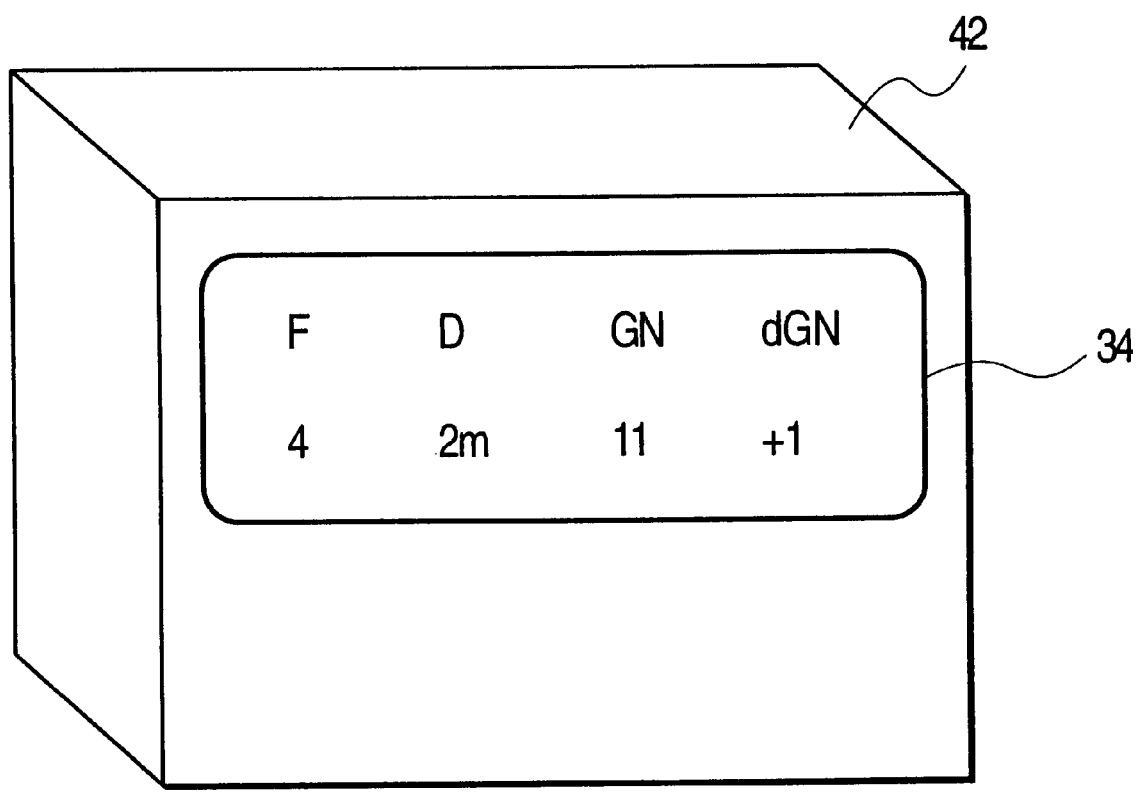
FIG. 8 is a diagram of a display unit of a flash control device according to a preferred embodiment of the present invention.

Referring now to FIG. 8, depicted therein is a diagram of a display unit 34 which has been disposed in the back of flash unit 42. The set aperture value F, the photographic range D, the guide number GN (e.g., a value corresponding to ISO 100), and the value dGN as found by following numerical equation 1, are displayed in display unit 34.

$$dGN = 2 \cdot \log 2(F \cdot D/GN) \quad (1)$$

Here dGN represents the APEX value of the extent of exposure correction that has been performed with respect to a subject of a standard reflectivity (about 18%). For example, if dGN=+1, it is believed to be 1 EV.

The structures described above are designed to operate together to achieve a flash control unit that is capable of reducing exposure times, etc. Such structures preferably are controlled via computer programs that are next described with regard to FIGS. 9–19 to which reference is now made.

Figure 9:
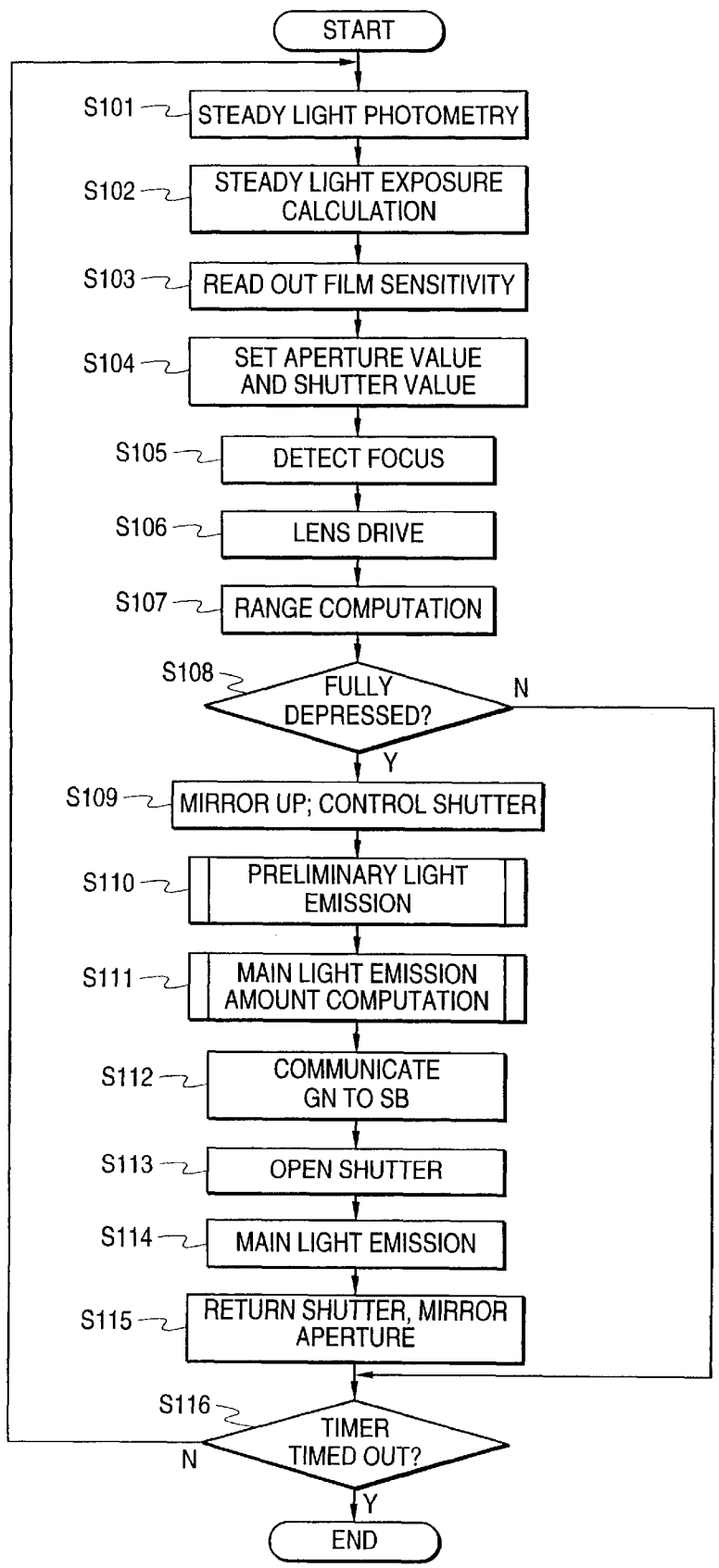
FIG. 9 is a flowchart which illustrates a control program deployed within a flash control device according to a preferred embodiment of the present invention.

Referring now to FIG. 9, depicted therein is a flowchart that illustrates the operations performed by microcomputer/data processing unit 41 (FIG. 1) to achieve the aforementioned flash unit control operations and, in particular, reduction of preliminary illumination operations to speed photographic and imaging operations. In particular, processing and operations start as a result of half-depressing release switch 24 of a camera to introduce a power supply to the camera and to start execution of a main software program.

At step S101, steady light photometry is carried out by photometric unit 21 to calculate luminosity values B1–B5.

Next, at step S102, a steady light exposure calculation is preformed by exposure calculation unit 22 to produce steady light exposure value BVa in accordance with the following equation:

$$BVa = (B1+B2+B3+B4+B5)/5 \quad (2)$$

At step S103, a film sensitivity value SV is read out from the sensitivity setting unit 35.

Next, at step S104, an aperture value (AV) and the shutter value TV are calculated from BVa and SV in accordance with the below-listed equation 3. In particular, there are plural combinations of AV and TV depending on the selected exposure mode (program, aperture priority, shutter priority) and the like. In the present mode of embodiment, there is no particular distinction in the method of selection.

$$BVa + SV = TV + AT \quad (3)$$

Next, at step S105, focus detection is performed by focus detection unit 28. And, at step S106, photographic lens 1 is driven to a focus position in accordance with photographic range D as determined at step S107.

Next, at step S108, it is determined whether the release switch 24 is fully depressed. If so, the program proceeds to step S109, and if not, the program jumps to step S116.

At step S109, mirror 2 is raised, and aperture 10 is set to the value corresponding to AV.

At step S110, preliminary light emission is performed in accordance with the present invention, and the preliminary light emission guide numbers corresponding to the regions S1–S5 are computed from the light adjustment data as described above. A method for finding the preliminary light emission guide numbers is described below with regard to FIG. 10.

Next, at step S111, a main light emission guide number GNm is computed from the preliminary light emission guide numbers, the aperture value F, and the photographic range D. A method for calculating GNm is described in detail below with regard to FIG. 11.

Next, at step S112, the computed guide number GNm which is output to the flash unit 42 (FIG. 2, for example). Then, at steps S113 and S114, shutter 11 is opened to allow main light emission in accordance with the computed guide number GNm and exposure to imaging element 12.

Next, at step S115, shutter 11 closes after a period of time set according to the shutter value TV, aperture 10 is returned, and mirror 3 is returned to its initial position. Thus, exposure control is thereafter stopped.

When exposure control ends, the program proceeds to step S116, and after the half depression of the release switch is cancelled by the half-depression timer, it is determined whether a predetermined time has elapsed. In the case that half depression continues or the timer is within the predetermined time, the process returns to step S101 and repeats. In the case that the timer times out, the program ends.

Figure 10:
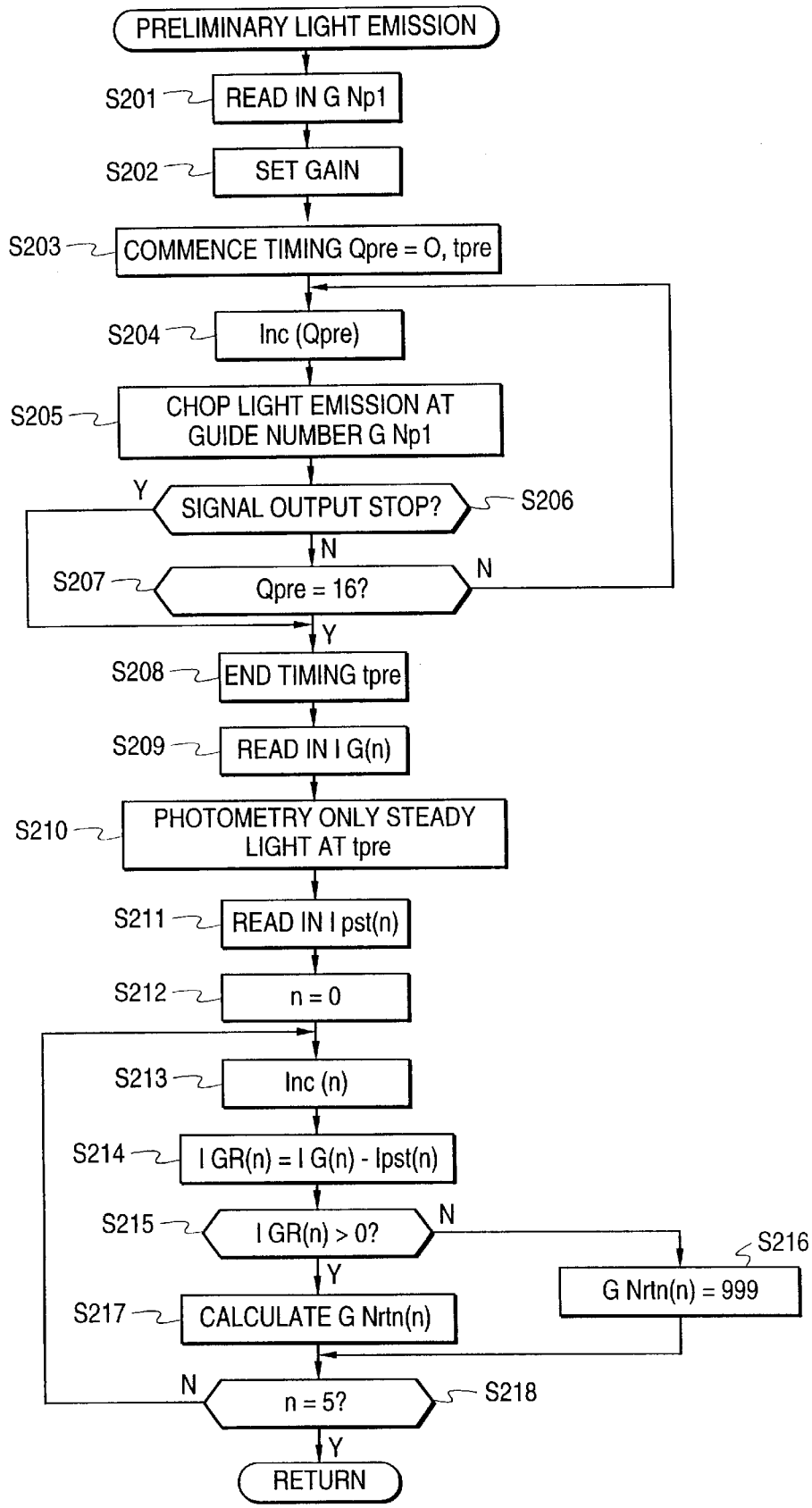
FIG. 10 is a flowchart which illustrates a subroutine of the control program depicted in FIG. 9.

Referring now to FIG. 10, depicted therein is a flowchart of a subroutine for controlling preliminary light emission time according to a preferred embodiment of the present invention. The calling of this subroutine is carried out by the execution of step S110 in FIG. 9.

Accordingly, at step 201, a guide number GNp1 for a first light emission is read out from the flash unit control device. This guide number is taken as the value for the case in which the film sensitivity was ISO 100.

Next, at step S202, the amplifier gain G pre(n) of the preliminary light emission control unit 26 is set as shown below in accordance with equation 4.

$$G\ pre(n) = \gamma\{AV + 3 + Log\ 2(\tfrac{1}{5}) - S\ \alpha(n)\} \quad (4)$$

Here, G pre(n) where n=1–5, are the respective numerals which correspond to the regions shown in FIG. 4, but are taken as the same amplifier gain as in the case of preliminary light emission. Moreover, AV (as determined by equation 3 (above)) is the APEX value of the shutter value which was previously set. S α(n) is a compensation value in order to make uniform the gain of each region. γ is a coefficient used in order for the STOP signal to allow a suitable amount of received light. Moreover, the term Log 2 (⅕) is used in order for the received light amounts to total to the integral value of the 5 regions. Moreover, in Log 2 (N), the 2 denotes the base of the logarithm.

Accordingly, the larger the AV value (i.e., the more the shutter is stopped down), the larger amplifier gain G pre. Such attributes are the case in order to compensate for the decrease in the irradiation of the shutter surface with further stopping down.

Next, at step S203, the variable Q pre, which indicates the number of times of preliminary light emission, is set to 0, and timing of the preliminary light emission time t pre commences.

At step S204, Q pre is incremented by 1 and at step S205, preliminary light emission is performed for a time in accordance a guide number GNp1.

Next, at step S206, it is determined whether a STOP signal has been output from the preliminary light emission control unit 26. In the case that a STOP signal was output, skipping the next step S207, the program proceeds to S208. Otherwise, the program proceeds to S207.

At step S207, it is determined whether the number of times Q pre of preliminary light emission has reached the highest number (e.g., 16 times, etc.). When it has reached 16 times, preliminary light emission is ended, and the program proceeds to step S208. If not, returning to S204, preliminary light emission is repeated (e.g., chop light emissions).

When preliminary light emission operations ends, at step S208, timing of the preliminary light emission time t pre ends. Then, at step S209, the integrated values IG(1)–IG(5) corresponding to the light adjustment regions S1–S5 are read out.

At step S210, SB is not caused to emit light for exactly the time which was timed by means of step S208, performing integration only of steady light, in step S211 its integrated values I pst(1)–I pst (5) are read out. Then, at step 212, the count n is set to 0, and continuing, at step S213, n is incremented by 1.

At step S214, an integrated value IGR(n), from which the effect of the steady light component has been removed, is computed by equation 5 (shown below) from the integrated value IG(n) of the preliminary light emission time which was read out and the integrated value I pst(n) due to the steady state light alone.

$$IGR(n) = IG(n) - I\ pst(n),\ n = 1-5 \quad (5)$$

In step S215, it is determined whether the value of IGR(n) which was found is greater than 0. In the case that it was not greater by means of step S216, the guide number of region GN rtn(n) is replaced with a sufficiently large number. Here, this value is taken as 999. In the case that IGR(n) is greater than 0, in step S217, the GN rtn(n) of each region is computed according to equation 6:

$$GN\ rtn(n) = GN\ p1 \cdot \{Q\ pre \cdot IG\ stop / IG(n) \cdot 2^{\wedge}(AV-2)/5\}^{\wedge}(\tfrac{1}{2}) \quad (6)$$

Here, the symbol "^" denotes exponentiation.

At step S218, it is determined whether the count n is 5. In the case that it is not, the program returns to step S213, and in the case that n=5, the illustrated subroutine ends.

Figure 11:
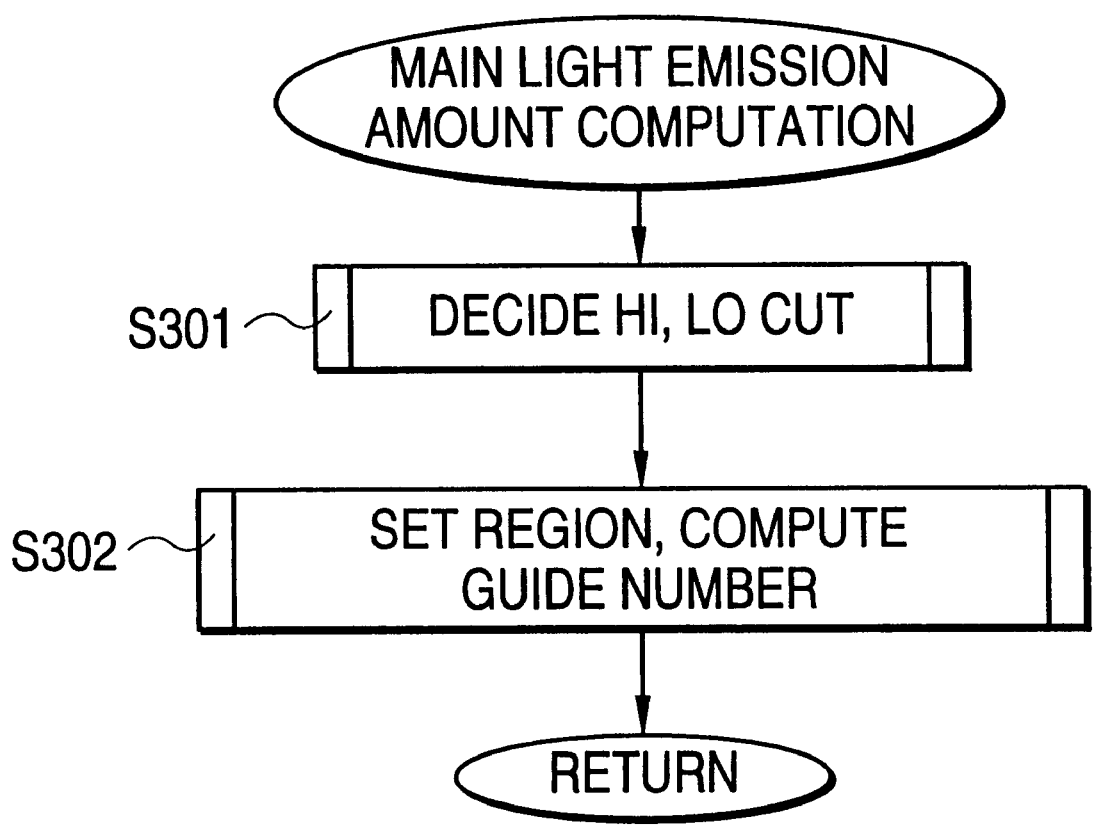
FIG. 11 is a flowchart which illustrates another subroutine of the control program depicted in FIG. 9.

Referring now to FIG. 11, depicted therein is a flowchart of a subroutine which computes an amount of main light emission according to a preferred embodiment of the present invention. Such a subroutine is called upon the execution of step S111 of the main flow chart of FIG. 9.

Accordingly, at step S301, in the light adjustment regions S1–S5, a region in which the reflectivity is abnormally high (Hi cut region) or abnormally low (Lo cut region) is discriminated. The discrimination process is described below.

Next, at step S302, based on the result of step S301, the region is set which is used in the computation of the main light emission amount, an the guide number of the main light emission time is computed simultaneously. Such a process is described below.

Figure 12:
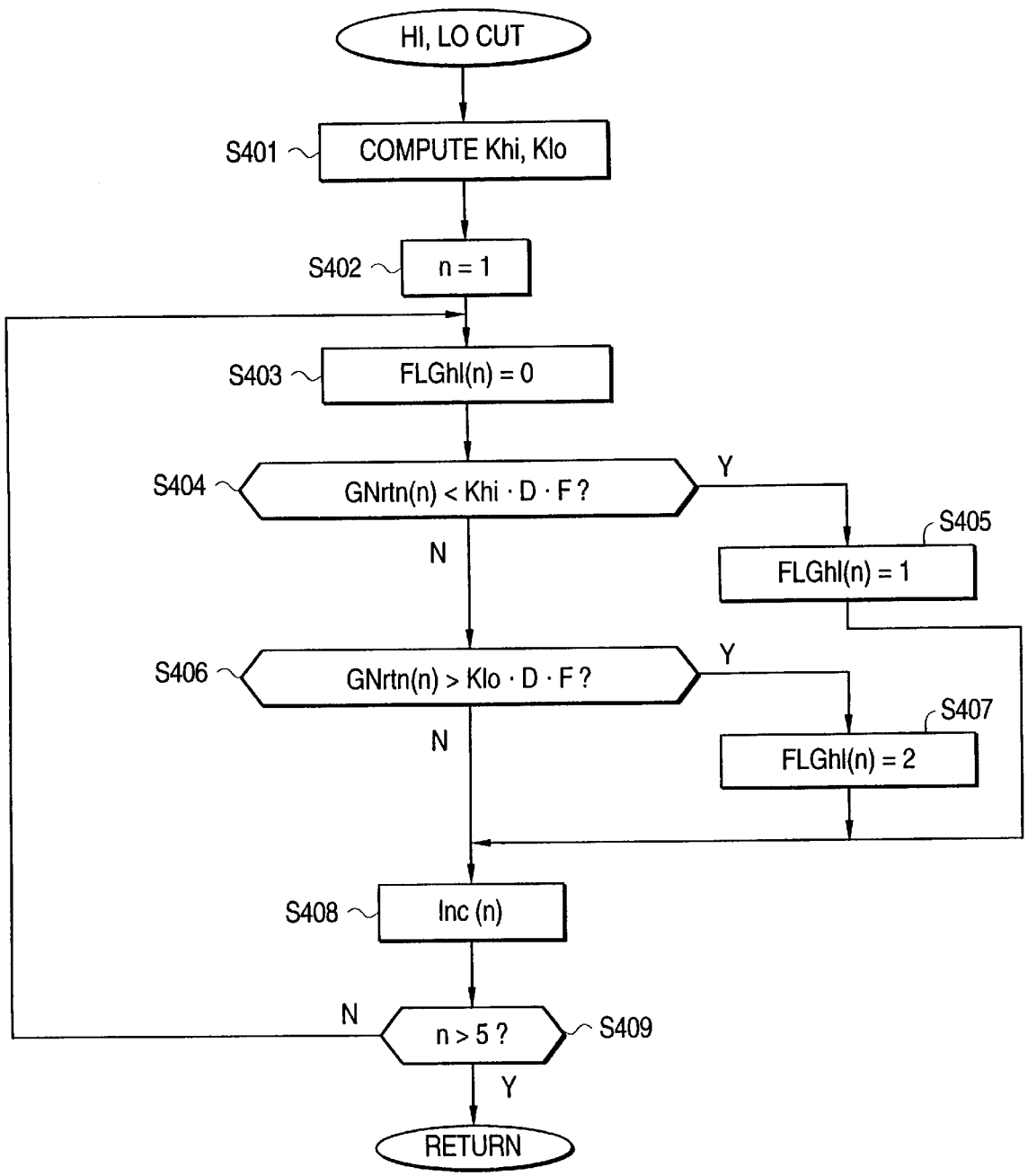
FIG. 12 is a flowchart which illustrates another subroutine of the control program depicted in FIG. 9.

Referring now to FIG. 12, depicted therein is a flowchart of a subroutine that illustrates the process steps of the aforementioned methods for Hi and Lo cutting as illustrated in FIG. 11. Such a subroutine is started by the execution of step S301 as illustrated in FIG. 11.

Accordingly, at step S401, a delay value until performing Hi cut and Lo cut operations is computed in terms of coefficients K hi, K lo. As regards the method of computing K hi, K lo, because a detailed description is given in the Applicant's Japanese Laid-Open Patent Publication H6-35030 (which is incorporated herein by reference), such a description is omitted.

Next, at step S402, the count n is set to 1. And, at step S403, a flag FLGhl(n) which shows whether there was a Hi cut or Lo cut is set to 0. In step S404, performing the determination shown in equation 7, in the affirmative case, proceeding to step S405, the flag FLGhl(n) is changed to the value 1 denoting a high value in FLGhl(n). In the negative case, the program proceeds to the next process.

$$GN\ rtn(n) < K\ hi \cdot D \cdot F? \tag{7}$$

Here, D is the photographic range (units=meters, for example), F is the set aperture value.

Accordingly, at step S406, the determination of equation 8 is performed. In the affirmative case, the program proceeds to step S407 and FLGhl (n) is replaced by the value 2 showing a Lo cut. In the negative case, the program proceeds to the next process.

$$GN\ rtn(n) > K\ lo \cdot D \cdot F? \tag{8}$$

The count n is incremented by 1 in step S408, and in step S409 it is determined whether n exceeds 5. In the case that it does not exceed 5, the program returns to step S403 and repeats the process. In the case that it exceeds 5, the process ends.

Accordingly, the reflectivity of the subject is determined in each region from the results of the preliminary light emission, and by cutting regions which are markedly different from the standard reflectivity, the result is that the amount of light emission calculation for the main light emission can be accurately computed.

Figure 13:
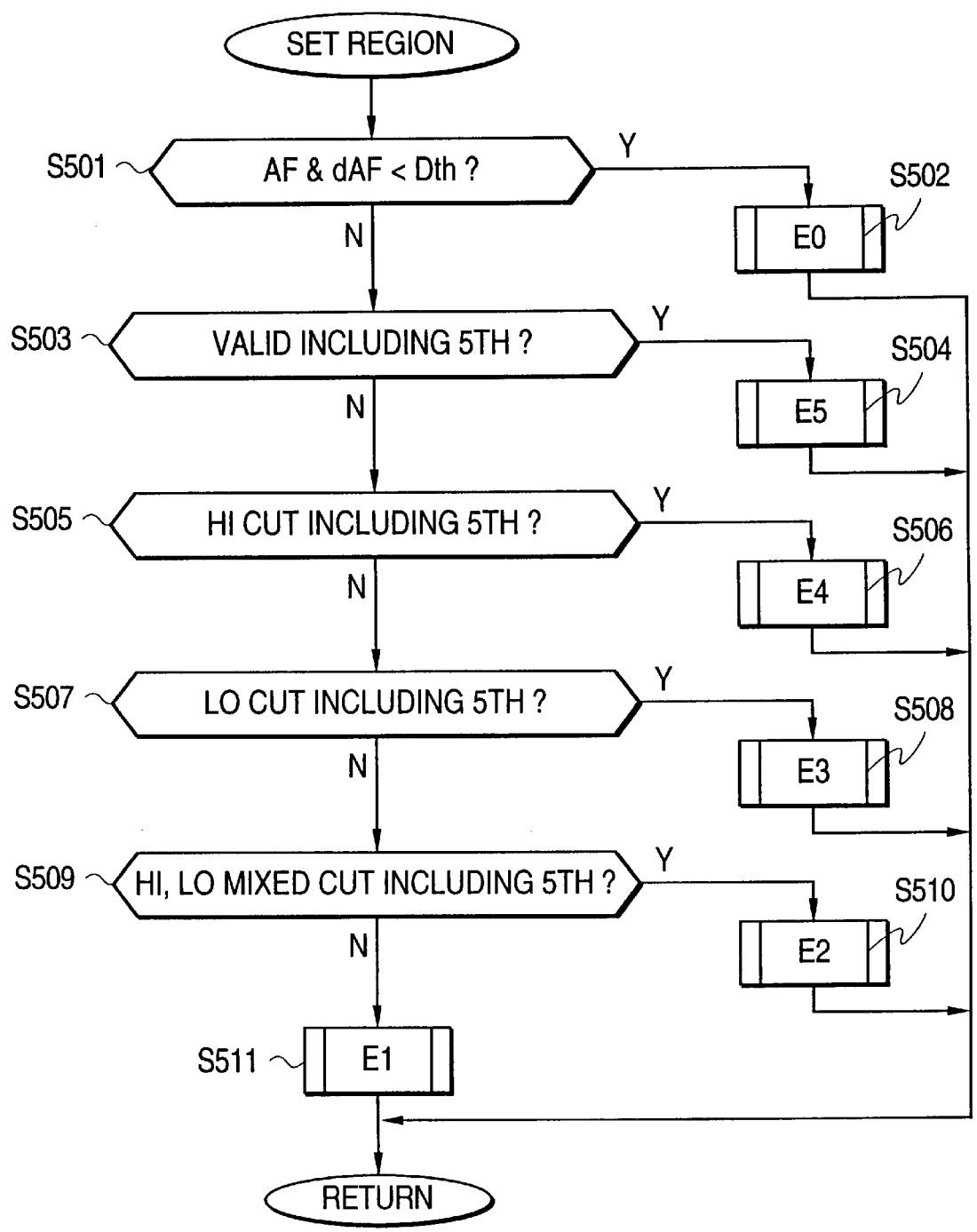
FIG. 13 is a flowchart which illustrates another subroutine of the control program depicted in FIG. 9.

Referring now to FIG. 13, depicted therein is a flowchart of a subroutine that includes process steps for performing a method of setting of a particular region as the standard region for main light emission amount computation, and the computation of a corresponding guide number. Such a subroutine is started by the execution of step S203 shown in FIG. 11.

Accordingly, at step S501, it is determined whether the camera setting is AF, namely in the automatic focus detection mode, and also whether or not the defocus amount dAF is less than the standard value Dth. The preferred value of Dth is, for example, about 150 microns.

In the case that step S501 is affirmative, process E0 (FIG. 14) is performed as shown at step S502. The process method of E0 is described below.

At step S503, it is determined whether the Hi, Lo cut determination result, the cut region was not an entirely effective region, namely, whether FLGhl(1)–FLGhl(5) are entirely 0. In this case, process E5 (FIG. 19) is performed at step S504.

At step S505, it is determined whether the determination result of Hi, Lo cut, was completely Hi cut, namely whether FLGhl(1)–FLGhl(5) was entirely 1. In this case, process E4 (FIG. 18) is performed in step S506.

At step S507, it is determined whether the result was completely Lo cut, namely whether FLGhl(1)–FLGhl(5) was entirely 2. In this case, process E3 (FIG. 17) is performed at step S508.

At step S509, it is determined whether the entire region is cut, and also whether there is a mixture of Hi cut and Lo cut, namely whether or not FLGhl(1)–FLGhl(5) was entirely 1 or entirely 2. In this case, process E2 (FIG. 16) is performed at step S510.

In cases other than these, there exist 1–4 effective regions, and in this case the process E1 (FIG. 15) is performed.

Figure 14:
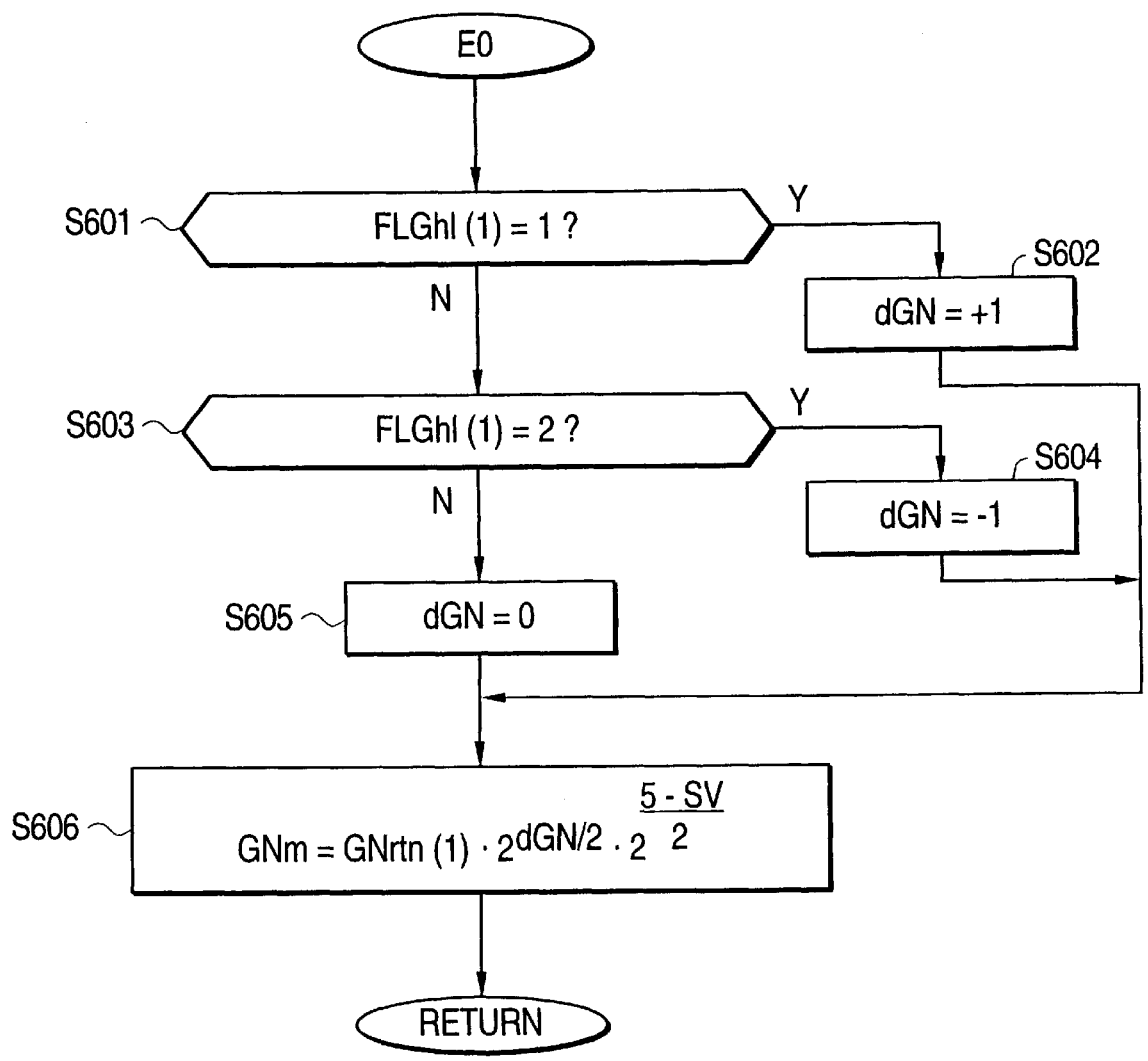
FIG. 14 is a flowchart which illustrates process E0 identified in FIG. 13.

FIG. 14 is a flow chart that illustrates the details process E0 of step S502 of FIG. 13.

Accordingly, at step 601, it is determined whether the center region is Hi cut, namely whether FLGhl(1)=1. In the case that FLGhl(1)=1, because there is a high possibility that the subject was highly reflective, +1 is substituted in the variable dGN which shows the main light emission compensation amount.

Next, at step S603, it is determined whether the center region is Lo cut, namely whether or not FLGhl(1)=2. In the case that FLGhl(1)=2, because there is a high possibility that the subject was not very reflective, −1 is substituted in the variable dGN which shows the main light emission compensation amount.

In cases other than those just described, at step S605, dGN=0 is substituted. Then, at step S606, a guide number GNm for the time of main light emission is computed, based on the calculation shown in equation 9.

$$GNm = GN\ rtn(1) \cdot 2^{\wedge}(dGN/2) \cdot 2^{\wedge}S\{(5-SV)/2\} \tag{9}$$

Here Sv is the APEX value representing the film sensitivity, and is the same as that written in equation 3 (above). Namely, because the guide number is a value with respect to the case of a film sensitivity of ISO 100, that is, SV=5, in the case that the film sensitivity is different, it is necessary to correct the guide number. For example, in the case of a film of ISO 400, because the sensitivity is 4 times that of the case of ISO 100, and SV=7, a suitable exposure can be obtained at half the guide number.

Figure 15:
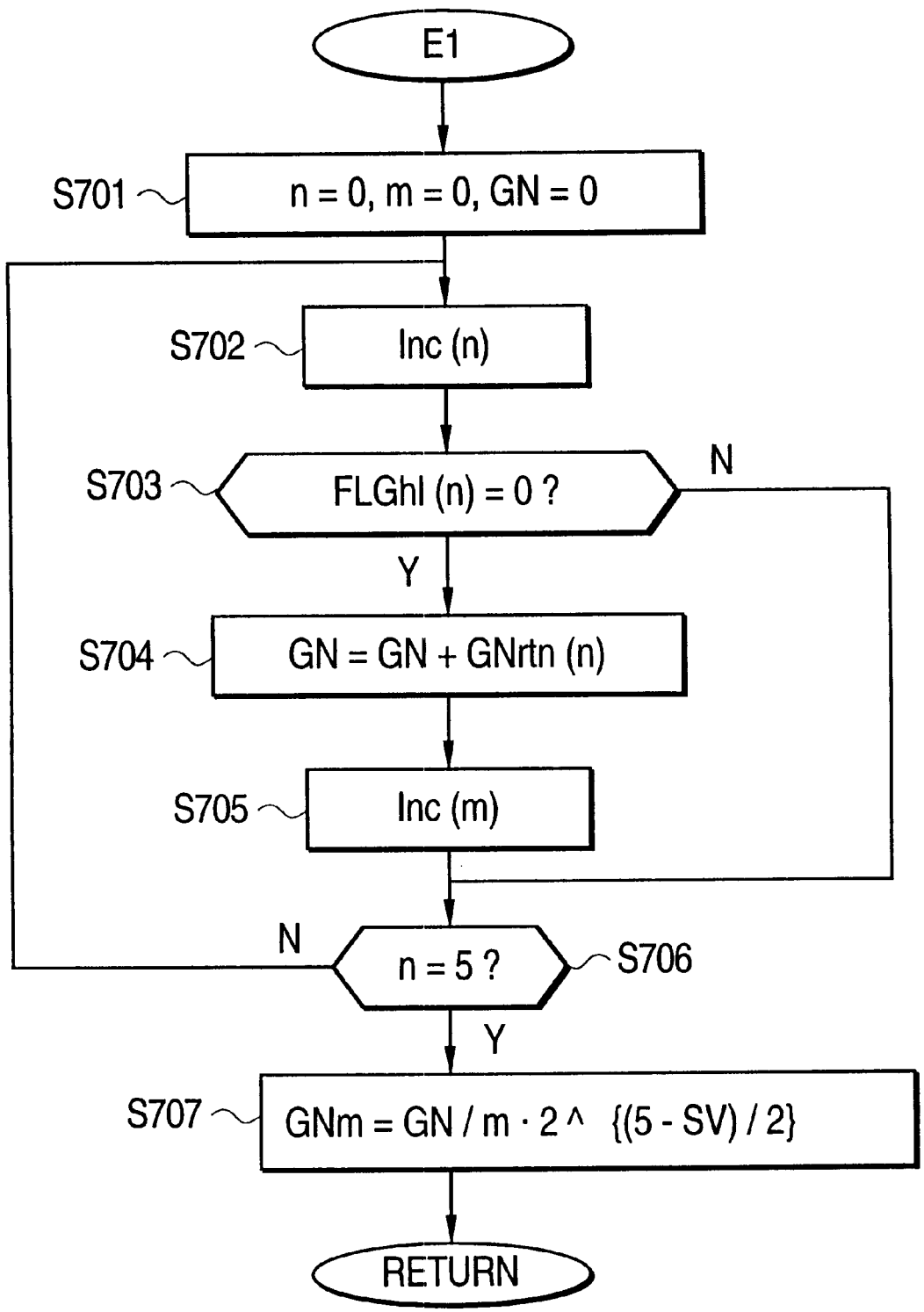
FIG. 15 is a flowchart which illustrates process E5 of identified in FIG. 13.

Referring now to FIG. 15, depicted therein is a flowchart of the process E5 depicted at step S504 of FIG. 13. That is, the process in the case that all 5 region results of preliminary light emission were effective is shown in detail.

Accordingly, at step S701, the counts m, n are respectively set to 0, and GN=0 is substituted. Next, in step S702, the count n is incremented by 1.

At step S703, it is determined whether the flag FLGhl (n)=0. That is, whether a particular region is effective and, at step S704, the process of equation 10 is performed.

$$GN = GN + GN\ rtn(n) \tag{10}$$

Next, at step S705, the count m is incremented by 1. At step S706, it is determined whether n=5. The program returns to step 702 and repeats a similar process until n=5.

At step S707, the guide number GNm for the time of the main light emission is computed by equation 11, and the process ends.

$$GNm = GN/m \cdot 2^{\wedge}\{(5-SV)/2\} \tag{11}$$

Figure 16:
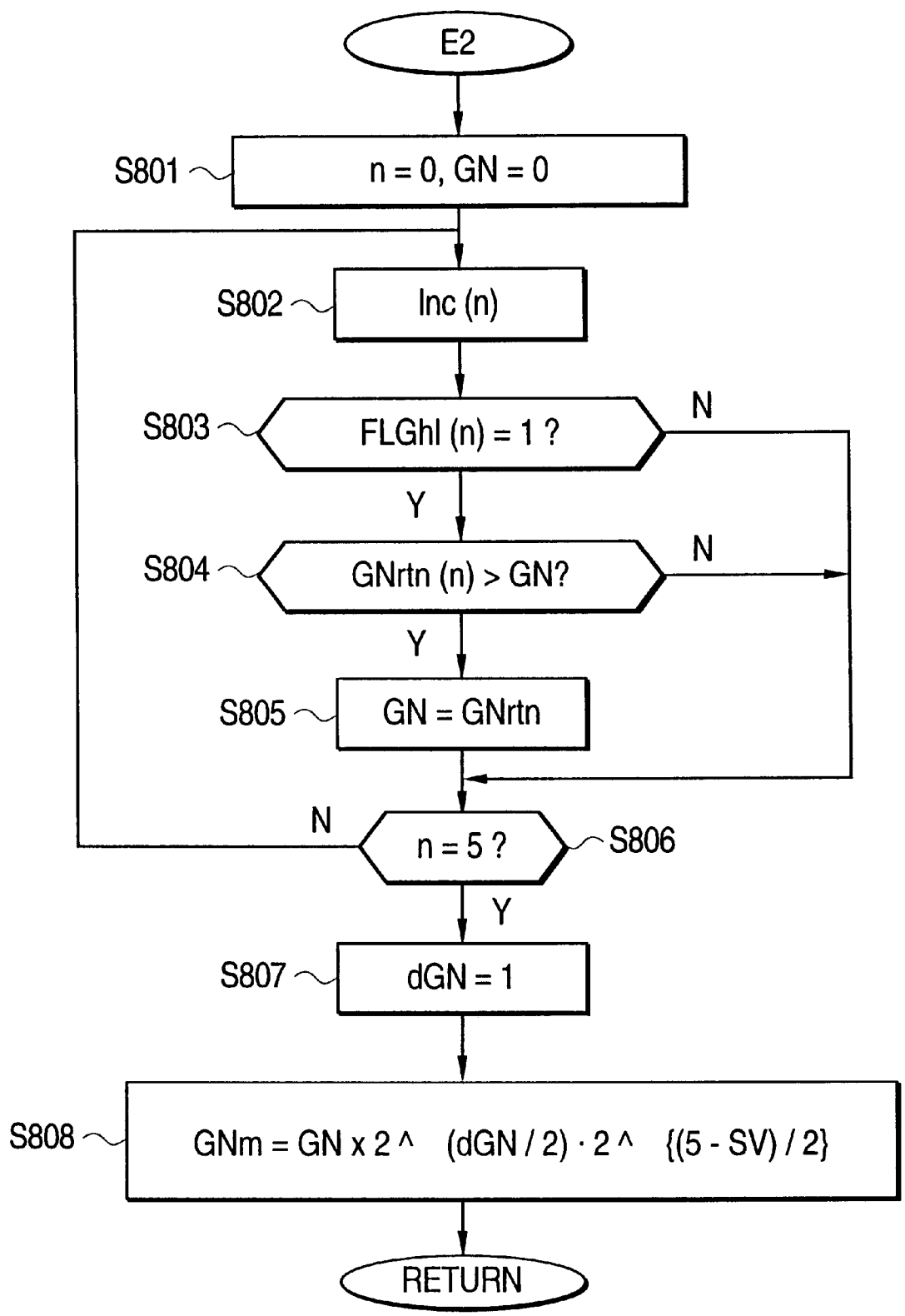
FIG. 16 is a flowchart which illustrates process E2 identified in FIG. 13.

Referring now to FIG. 16, depicted therein is a flowchart of the E2 process depicted at step S510 of FIG. 13. That is, the E2 process will be carried out if not all 5 region results of preliminary light emission are effective. The E2 process also is a one in which a mixture of Hi cut and Lo cut operations are shown in detail.

Accordingly, at step S801, it is determined whether FLGhl(n)=1 i.e., whether a region is Hi cut. If affirmative, an equation 12 is performed. If affirmative, in step S805, Gn is substituted by a new GN rtn(n).

$$\text{GN rtn}(n) > \text{GN?} \quad (12)$$

That is, in GN, Hi cut among 5 regions, and also, a maximum value is substituted for the preliminary light emission guide number GN rtn(n). The question mark in equation 12 denotes a possible maximum value.

At step S806, it is determined whether n=5, and returns to step S802 until n=5, repeating a similar process.

Next, at step S807, by means of the value computed in equation 13, gives the guide number correction value dGN. The units in equation 13 are EV.

$$dGN = +1 \quad (13)$$

In this case, with respect to the guide number obtained by means of this preliminary light emission, a light amount correction of +1 EV is carried out. Then, at step S808, the guide number GNm of the main light emission is computed in accordance with equation 14, and the process ends.

$$GNm = GN \times 2^{\wedge}(dGN/2) \cdot 2^{\wedge}\{(5-SV)/2\} \quad (14)$$

Figure 17:
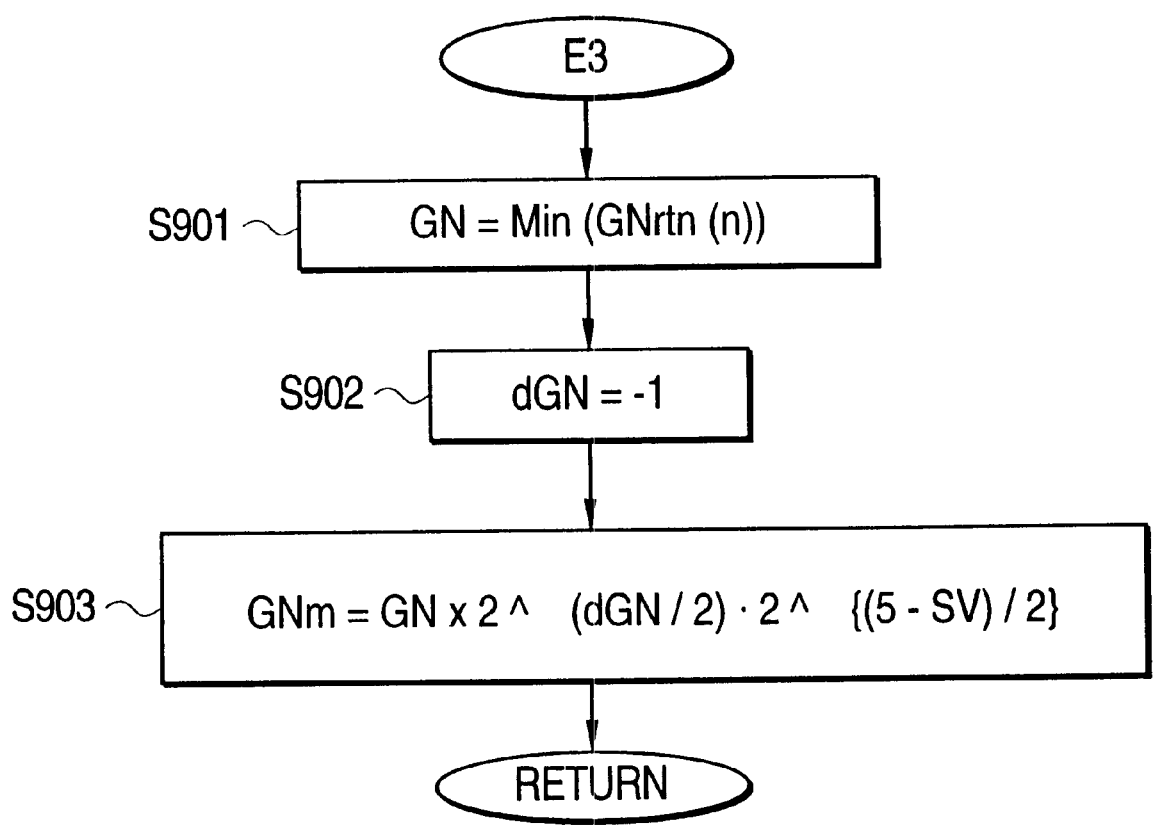
FIG. 17 is a flowchart which illustrates process E3 identified in FIG. 13.

Referring now to FIG. 17, depicted therein is a flowchart of the E3 process depicted at step S508 of FIG. 13. Process E3 shows in detail the process in the case that all 5 region results of preliminary light emission were Lo cut.

Accordingly, at step S901, GN is computed by the calculation shown in equation 15.

$$GN = \text{Min}(GN\ \text{rtn}(n)), n=1-5 \quad (15)$$

Here the function Min is a function which denotes the minimum value among its arguments.

Next, at step S902, the guide number correction value dGN is obtained by means of the value shown in equation 16. The units of equation 16 are EV.

$$dGN = -1 \quad (16)$$

That is, in this case, for the guide number obtained by means of preliminary light emission, a light emission correction of −1 EV is carried out. Then, at step S903, by means of the calculation shown in equation 14 (above), the main light emission guide number GNm is computed, and the process ends.

Figure 18:
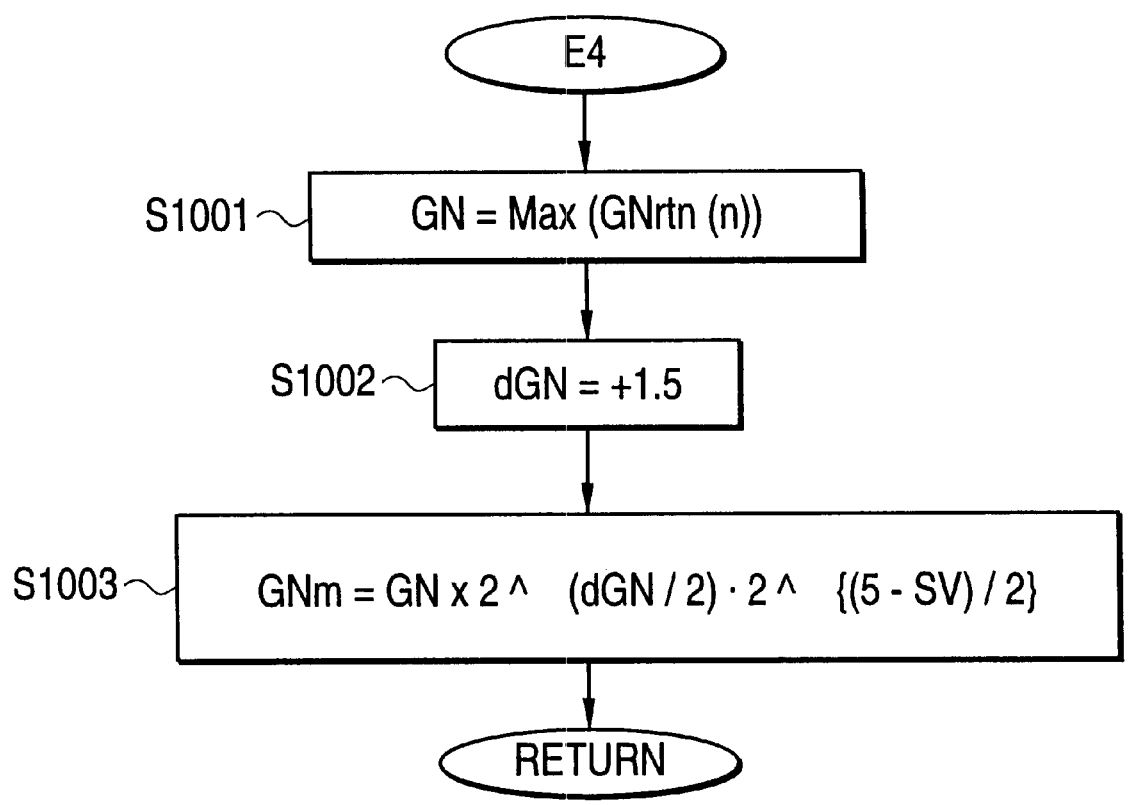
FIG. 18 is a flowchart which illustrates process E4 identified in FIG. 13.

Referring now to FIG. 18, depicted therein is a flowchart of the E4 process depicted at step S506 of FIG. 13. The E4 process shows in detail the process in the case that all 5 region results of preliminary light emission were Hi cut.

Accordingly, at step S1001, GN is computed by the calculation shown in equation 17.

$$GN = \text{Max}(GN\ \text{rtn}(n)), n=1-5 \quad (17)$$

Here the function Max is a function which denotes the maximum value among its arguments.

Next, at step S1002, the guide number correction value dGN is obtained by means of the value shown in equation 18. The units of equation 18 are EV.

$$dGN = +1.5 \quad (18)$$

That is, in this case, for the guide number obtained by means of preliminary light emission, a light emission correction of +1.5 EV is carried out. Then, at step S1003, by means of the calculation shown in equation 14 (above), the main light emission guide number GNm is computed, and the process ends.

Figure 19:
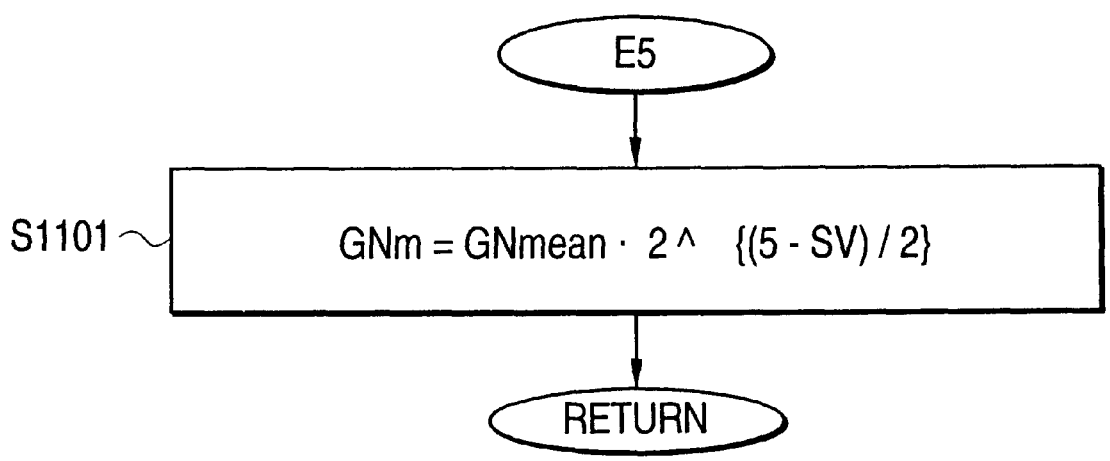
FIG. 19 is a flowchart which illustrates process E5 identified in FIG. 13.
Figure 20:
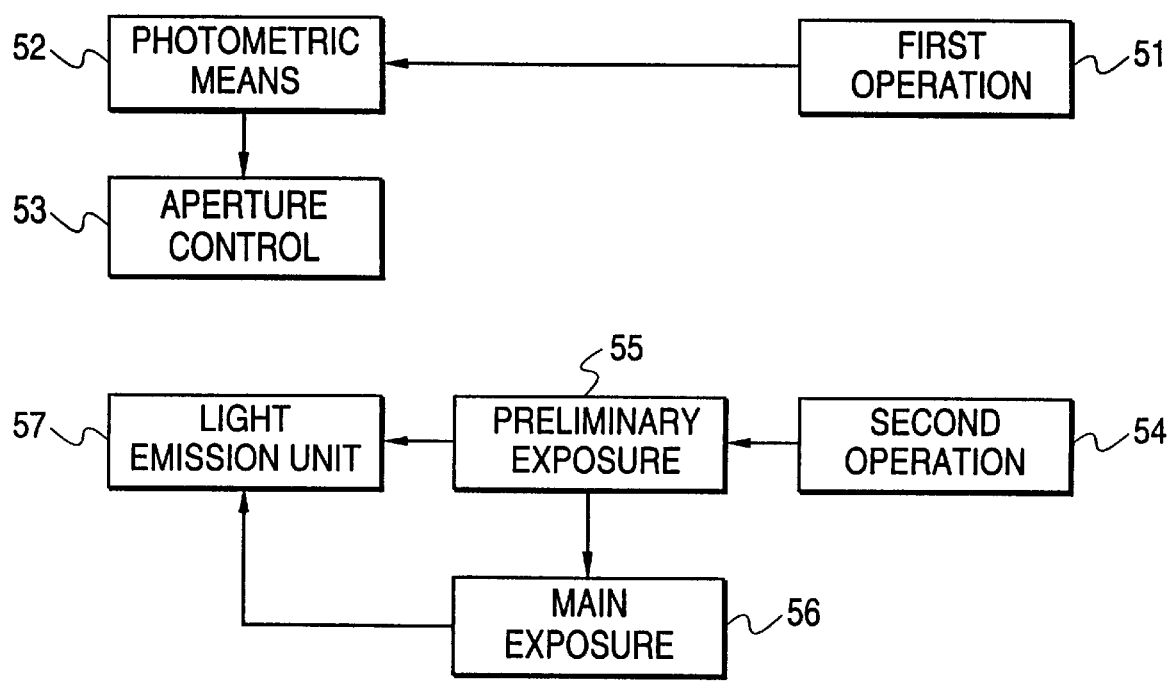
FIG. 20 is a diagram of an exemplary imaging device according to the prior art.

Referring now to FIG. 19, depicted therein is a flowchart of the E5 process depicted at step S504 of FIG. 13. The E5 process shows in detail the process in the case that all 5 region results of preliminary light emission were effective.

In this case, at step S1101, the guide number for the time of the main light emission is computed according to the following equation 19.

$$GNm = GNmean \cdot 2\{(5-SV)/2\} \quad (19)$$

Here GNmean is the function denoting the average of the GN rtn(n) (n=1–5).

In this manner, from the results of the preliminary light emission, the light emission amount level at the time of main light emission is decisively and finely corrected, and even for subjects whose reflectivity is far from a standard reflectivity, appropriate light emission control can be performed.

The preferred embodiments of the present invention described in detail above allow certain benefits and produce results not heretofore realized. For example, preliminary light emission is performed while receiving light reflected from a shutter surface 11 and based on the output from the preliminary light emission control unit 26. As such, a main light emission calculating unit 31 may now compute a flash light emission amount at the time of the main exposure. Accordingly, electronic cameras and the like are now able to perform TTL light adjustment at the time of a main exposure regardless of whether the diffusing characteristics of an imaging surface are poor. Additionally, the present invention allows TTL light adjustment regardless if there is relative displacement between a photographic region and a photometric region due to parallax. And, since unnecessary preliminary illumination is avoided, data processing time taken during preliminary light emission operations are shortened. As a result, a photographer now will be able to freely set aperture values and the like since it becomes possible to provide a flash control device which incorporates the features of TTL light adjustment components and possesses.

Additionally, by communicating a flash light emission amount value at the time of the main light emission, the invention can be applied even in the case that a detachable flash light unit 42 is used.

Additionally, the main light emission calculating unit 31, by computing the flash light emission amount based on guide numbers, control of the flash light emitter 42 becomes easy.

Additionally, by means of equipping a camera/flash unit with a display unit 34 which displays guide numbers, etc., it becomes possible for a photographer to know the light emission amount, and it becomes possible to decide the success or failure of photographic results.

Furthermore, the display unit 34, by displaying the correction value of the flash light emission amount which was found by the main light emission calculating unit 31, makes it possible to decide the success or failure of the photographic results.

Also, the main light emission control unit 32 controls the flash light emission amount by means of control of the light emission time, and performs control of the light emission amount.

Additionally, because the main light emission control unit 32 controls the flash light emission amount based on the output of a monitor element 36 which is disposed within the flash light unit, it becomes possible to accurately control the light emission amount.

Because the preliminary light emission control unit 26 controls the light emission amount by means of repeatedly emitting light (e.g., light pulses, an extended period of preliminary illumination, etc.) until the preliminary light emission of the previously established guide number becomes a predetermined light emission amount, accurate control becomes possible of the preliminary light emission amount, even when a detachable flash light unit 42 is used.

And, because reflected light may be received via a taking lens and reflected off of a shutter structure, diffusion characteristics of a film or solid state imaging element do not interfere with or inhibit operation of a light adjustment device like or similar to preliminary light emission control unit 26 provided by the present invention. And, since reflected light may be realized via a taking lens in conjunction with a solid state imaging element, problems associated with parallax and the like may be avoided. As a result, high quality images and photographs may be realized.

Because the preliminary light emission control unit 26 sets the amplification factor of the light receiving unit 15, it becomes possible to restrain the preliminary light emission amount to a light emission amount of the necessary minimum limit.

Because the preliminary light emission control unit 26 is equipped with a divided type of light receiving unit 15, and the main light emission calculating unit 32, based on the output of the preliminary light emission control unit 26, selects the region used in computing the main light emission amount, optimum computation of the main light emission amount becomes possible.

Because the main light emission calculating unit 31 selects the region in which the reflectivity of the subject appears to be closest to a standard reflectivity, optimum computation of the main light emission amount becomes possible.

Because the main light emission calculating unit 31, which is furthermore equipped with a focus detection unit 28 which performs focus detection of specific region(s) of the subject field, selects the light receiving region which overlaps with the focus detection region, optimum computation of the main light emission amount becomes possible.

Because the main light emission calculating unit 31 is such as to exclude from the calculation object, regions in which the reflectivity of the subject is greater than a predetermined value from a standard reflectivity, optimum computation of the main light emission amount becomes possible.

Also, as shown in FIG. 2, the case in which a shutter 11 is disposed has been described. The present invention is not so limited. For example, where a solid-state imaging element is used and no shutter is required, a reflecting body may be disposed so as to be moved out of an imaging path. Accordingly, the present invention is applicable to imaging devices of many varieties including, but not limited to, conventional film cameras, digital cameras, etc.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A flash control device for use with a camera, comprising:
   a light emission unit which emits light to illuminate a subject to be imaged by the camera;
   a preliminary light emission control unit which causes said light emission unit to emit light during a preliminary light emission operation prior to a main exposure operation to be performed by the camera and until a predetermined amount of light is received at the camera during said preliminary light emission operation;
   a light guide unit disposed before an imaging unit of said camera configured to guide light reflected by said subject to be imaged to said preliminary light emission control unit;
   a main light emission calculation unit which calculates an amount of light that said light emission unit is to emit during a main light emission operation based on said guided light reflected by said subject to be imaged during said preliminary light emission; and
   a main light emission control unit which controls the emission of light by said light emission unit during a main exposure operation within the camera based on an output of said main light emission calculation unit.

2. The flash control device according to claim 1, wherein said main light emission control unit is disposed in a flash unit assembly configured to be operatively coupled to the camera via an interface, said main light emission calculating unit communicating said calculated amount of light to said main light emission control unit via said interface.

3. The flash control device according to claim 1, wherein said calculated amount of light is calculated by said main light emission calculating unit based on corresponding computed guide numbers.

4. The flash control device according to claim 1, wherein said main light emission calculation unit computes said amount of light based on at least one guide number generated in accordance with said preliminary light emission operation.

5. The flash control device according to claim 1, further comprising a display unit to display said at least one guide number.

6. The flash control device according to claim 3, wherein said display unit displays compensation values corresponding to said amount of light computed by said main light emission calculation unit.

7. The flash control device according to claim 1, wherein said main light emission control unit controls light emission by controlling said amount of light.

8. The flash control device according to claim 1, further comprising a monitor element to directly monitor the amount of light emitted by said light emission unit, said main light emission control unit controlling emission of light by said light emission unit based on an output generated by said monitor element.

9. The flash control device according to claim 1, wherein said preliminary light emission control unit controls said emission of light by said light emission unit by repetitive light emissions until the preliminary light emission of a previously established guide number reaches a predetermined value.

10. The flash control device according to claim 1, wherein said preliminary light emission control unit sets an amplification factor of a light receiving unit according to a camera aperture value upon commencement of said preliminary light emission operation.

11. The flash control device according to claim 1, wherein said preliminary light emission control unit includes a divided photometric element and said main light emission calculating unit selects a particular region of said divided photometric element to calculate said amount of light that said light emission unit is to emit during said main light emission operation based on said guided light reflected by said subject to be imaged during said preliminary light emission and a corresponding output of said preliminary light emission control unit.

12. The flash control device according to claim 11, wherein said main light emission calculating unit selects said particular region of said divided photometric element by determining that said particular region generates a signal corresponding to a reflectivity factor that is closest to a standard reflectivity.

13. The flash control device according to claim 11, further comprising a focus detection system which performs focus detection relative to a focus detection region of an imaging field including said subject, said main light emission calculating unit selecting said particular region based on a correspondence between said focus detection region and said particular region.

14. The flash control device according to claim 11, wherein said main light emission calculating unit excludes from calculation regions of said divided photometric element for which respective reflectivity characteristics of said regions are beyond a predetermined value.

15. The flash control device according to claim 1, further comprising:
a range computing unit which computes a distance from the camera to said subject to be imaged, and wherein said amount of light calculated by said main light emission calculation unit is based upon said guided light reflected by said subject to be imaged and said distance.

16. The flash control device according to claim 1, further comprising:
an exposure calculation unit computing an aperture value for the camera, said amount of light calculated by said main light emission calculation unit is based upon said guided light reflected by said subject to be imaged and said aperture value.

17. The flash control device according to claim 1, further comprising:
an exposure calculation unit computing an aperture value for the camera and a range computing unit which computes a distance from the camera to said subject to be imaged, said amount of light calculated by said main light emission calculation unit is based upon said guided light reflected by said subject to be imaged, said aperture value and said distance.

18. An imaging system, comprising:
an imaging unit configured to generate signals corresponding to an image of a subject;
a flash lighting assembly having a light emission unit which emits light to illuminate said subject to be imaged, and a preliminary light emission control unit which causes said light emission unit to emit light during a preliminary light emission operation prior to a main exposure operation to be performed by the imaging system and until a predetermined amount of light is received at the imaging system during said preliminary light emission operation;
a light guide unit disposed before said imaging unit of said imaging system and which is configured to guide light reflected by said subject to be imaged to said preliminary light emission control unit;
a main light emission calculation unit which calculates an amount of light that said light emission unit is to emit light during a main light emission operation based on said guided light reflected by said subject to be imaged during said preliminary light emission; and a main light emission control unit which controls the emission of light by said flash lighting assembly and said light emission unit during a main exposure operation within the imaging system based on an output of said main light emission calculation unit.

19. The imaging system according to claim 18, further comprising:
a flash mounting unit configured to removably receive said flash lighting unit, said flash lighting unit bi-directionally communicating electrical signals related to said preliminary light emission operation and said main light emission operation with the imaging system via said flash mounting unit.

20. The imaging system according to claim 18, wherein said flash illumination unit includes plural flash light sources configured to correspondingly emit light during said preliminary light emission operation and during said main exposure operation.

21. The imaging system according to claim 15, wherein said light guide unit is disposed to receive light reflected by said subject through an objective lens of the imaging system.

22. The imaging system according to claim 18, wherein said preliminary light emission control unit includes a photometric system and the imaging system further comprises:
an imaging assembly including a taking lens and an imaging element configured to generate signals corresponding to an image of said subject, and wherein
said light guide unit is further configured to guide light reflected by said subject to be imaged through said taking lens to become incident on said photometric system of said preliminary light emission control unit.

23. The imaging system according to claim 22, wherein said light guide unit is a shutter configured to open during said main exposure operation to permit said imaging element to generate signals corresponding to said image of said subject.

24. The imaging system according to claim 18, further comprising:
a range computing unit which computing a distance from the imaging system to said subject to be imaged, said amount of light calculated by said main light emission calculation unit is based upon said guided light reflected by said subject to be imaged and said distance.

25. The imaging system according to claim 18, further comprising:
an exposure calculation unit computing an aperture value for the imaging system, said amount of light calculated by said main light emission calculation unit is based upon said guided light reflected by said subject to be imaged and said aperture value.

26. The imaging system according to claim 18, further comprising:
an exposure calculation unit computing an aperture value for the imaging system and a range computing unit which computes a distance from the imaging system to said subject to be imaged, said amount of light calculated by said main light emission calculation unit is based upon said guided light reflected by said subject to be imaged, said aperture value and said distance.

27. A method for controlling the operation of an electronic flash device adapted for use with a camera, comprising the steps of:
causing a light emission unit to emit light during a preliminary light emission operation prior to a main exposure operation to be performed by the camera and until a predetermined amount of light is received at the camera during said preliminary light emission operation;

guiding light reflected by a subject to be imaged during said preliminary light emission to the camera;

calculating an amount of light that said light emission unit is to emit during a main light emission operation based on said guided light reflected by said subject to be imaged; and controlling the emission of light by said light emission unit during a main exposure operation within the camera based on a result obtained during said calculating step.

28. The method according to claim 27, wherein said predetermined amount of light corresponds to a guide number value determined prior to commencement of said preliminary light emission operation.

29. The method according to claim 27, further comprising the steps of:

computing a distance from the camera to said subject to be imaged, said calculating step calculates said amount of light based on said guided light reflected by said subject to be imaged and said distance.

30. The method according to claim 27, further comprising the steps of:

computing an aperture value for the camera, said calculating step calculates said amount of light based on said guided light reflected by said subject to be imaged and said aperture value.

31. The method according to claim 27, further comprising the steps of:

computing an aperture value for the camera during said preliminary light emission operation and computing a distance from the camera to said subject to be imaged, said calculating step calculates said amount of light based on said guided light reflected by said subject to be imaged, said aperture value, and said distance.

* * * * *